(12) United States Patent
Huang et al.

(10) Patent No.: US 7,888,888 B2
(45) Date of Patent: Feb. 15, 2011

(54) LIGHT SOURCE APPARATUS AND DRIVING APPARATUS THEREOF

(75) Inventors: Jui-Feng Huang, Hsinchu (TW); Lung-Pin Chung, Hsinchu (TW)

(73) Assignees: Industrial Technology Research Institute, Hsinchu (TW); UPEC Electronics Corporation, Jhonghe, Taipei (TW)

( * ) Notice: Subject to any disclaimer, the term of this patent is extended or adjusted under 35 U.S.C. 154(b) by 64 days.

(21) Appl. No.: 12/133,814

(22) Filed: Jun. 5, 2008

(65) Prior Publication Data

US 2009/0015172 A1  Jan. 15, 2009

Related U.S. Application Data

(63) Continuation-in-part of application No. 11/830,857, filed on Jul. 31, 2007, now abandoned.

(30) Foreign Application Priority Data

Jul. 11, 2007  (TW) ............................... 96125235 A

(51) Int. Cl.
*H05B 37/02* (2006.01)
(52) U.S. Cl. ...................... 315/307; 315/291
(58) Field of Classification Search ............. 315/185 R, 315/186, 200 R, 209 R, 224–226, 247, 291, 315/307, 308, 360
See application file for complete search history.

(56) References Cited

U.S. PATENT DOCUMENTS 5,719,474 A * 2/1998 Vitello ........................ 315/307

6,127,783 A 10/2000 Pashley et al.
6,445,139 B1 9/2002 Marshall et al.

(Continued)

FOREIGN PATENT DOCUMENTS

WO  WO 2006/102355 A2  9/2006

OTHER PUBLICATIONS

Office Action issued in Japanese Patent Application 2007-263217 on Aug. 31, 2010, 2 pages.

*Primary Examiner*—Jacob Y Choi
*Assistant Examiner*—Jimmy T Vu
(74) *Attorney, Agent, or Firm*—Finnegan, Henderson, Farabow, Garrett & Dunner, LLP

(57) ABSTRACT

A light source driving apparatus to drive at least one light source module includes a switch unit for coupling in series with an AC power source and the light source module; a clock synchronization unit for coupling to the AC power source and to provide a clock synchronization signal in accordance with an AC voltage of the AC power source; a control unit coupled to receive the clock synchronization signal and to provide to the switch unit an adjusting signal according to a timing of the clock synchronization signal; and a feedback unit coupled to the control unit and to detect a load state of the light source module, the feedback unit configured to provide to the control unit a feedback signal having a value representative of the detected load state of the light source module. The control unit is configured to modulate a pulse width of the adjusting signal according to the feedback signal and a preset brightness value of the light source module, the switch unit responsive to the adjusting signal to open and close to apply the AC voltage to the light source module in accordance with the modulated pulse width.

43 Claims, 15 Drawing Sheets

U.S. PATENT DOCUMENTS

| | | |
|---|---|---|
| 6,495,964 B1 | 12/2002 | Muthu et al. |
| 6,894,442 B1 | 5/2005 | Lim et al. |
| 7,081,722 B1 | 7/2006 | Huynh et al. |
| 7,221,111 B2 * | 5/2007 | Hirosawa ..................... 315/360 |
| 7,358,679 B2 * | 4/2008 | Lys et al. ....................... 315/51 |
| 2007/0126656 A1 | 6/2007 | Huang et al. |
| 2008/0007510 A1 | 1/2008 | Huang et al. |
| 2008/0012820 A1 | 1/2008 | Yang et al. |
| 2008/0018267 A1 * | 1/2008 | Arakawa et al. ............. 315/301 |
| 2009/0015174 A1 * | 1/2009 | Huang et al. ................. 315/250 |

\* cited by examiner

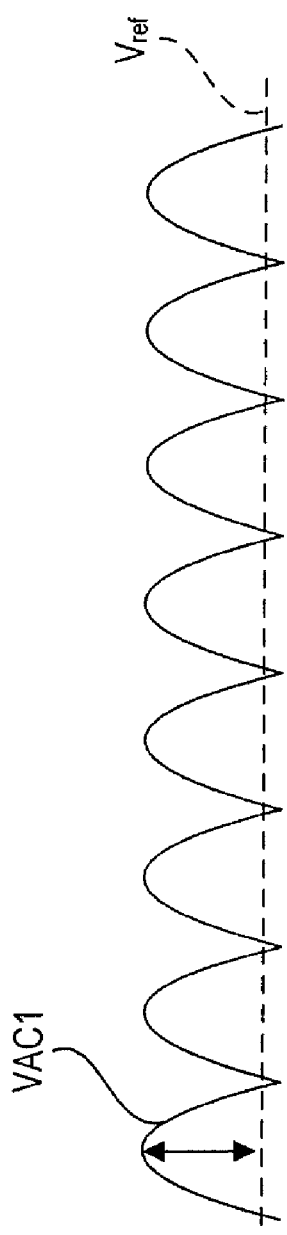
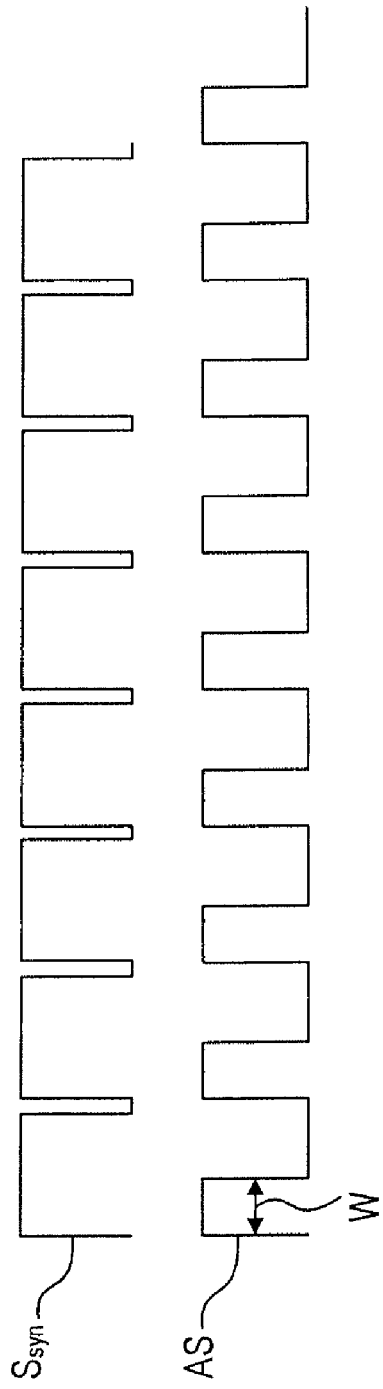
FIG. 5(A)
FIG. 5(B)
FIG. 5(C)
FIG. 5(D)

LIGHT SOURCE APPARATUS AND DRIVING APPARATUS THEREOF

CROSS-REFERENCE TO RELATED APPLICATION

This application is a continuation-in-part of parent U.S. application Ser. No. 11/830,857 filed Jul. 31, 2007 now abandoned and claims priority of Taiwan application serial no. 96125235, filed Jul. 11, 2007. All disclosure of the parent U.S. and Taiwan applications is incorporated herein by reference.

DESCRIPTION

1. Technological Field

Embodiments disclosed herein relate to a light source driving apparatus and methods for controlling a light source.

2. Description of Related Art

Light emitting diodes (LEDs) are commonly used as visual functionality indicators for electronic devices. LEDs are advantageous for use in electronic devices because LEDs consume little power and react quickly to input and changes in the state of a device. More recently, LEDs have been developed for backlighting liquid crystal displays (LCD), and for electronic illumination. LEDs are used in public electronic displays such as vehicle lamps, traffic lights, bulletin board/message marquees, large-scale video walls, and projectors, among other things.

Recently, LEDs have been widely used in LCD backlight modules. For example, LEDs are used as a backlight in small-size LCDs, like those used in mobile phone and vehicle displays. However, problems remain to be solved in the application of LEDs for backlighting of larger scale LCDs. Such problems include limited light uniformity, low LED driving efficiency, and high cost LEDs. Conventional solutions to such problems include use of direct current (DC) driving units to drive the LEDs, which may improve conversion efficiency and enhance feedback control in the driving unit. Improved conversion efficiency and enhanced feedback control may also improve the LED light uniformity, but increases the complexity and price of the driving unit.

Alternating current (AC) may also be used to drive LEDs. FIG. 1 of the present application is a circuit diagram from U.S. Pat. No. 7,081,722. In FIG. 1, an AC driving apparatus 100 is divided into a four-phase driving architecture using the AC voltage variation to drive LEDs G1-G4 to emit light in a sequence. Switches S1-S4 and over-current detectors 110-140 are disposed at opposite ends of LEDs G2-G4. The over-current detectors 110-140 have a preset value used to adjust the current supplied to one of LEDs G1-G4 at a time. Accordingly, differences in phase and driving time spans cause LEDs G1-G4 to each emit light at different intensities. As a result, AC driving apparatus 100 may cause non-uniform light intensity in a backlight display.

SUMMARY

Accordingly, a light source apparatus and a light source driving unit that effectively improves light uniformity and the driving efficiency of the light source module is disclosed.

The driving unit is suitable for driving at least one light source module. The driving unit may include some or all of a first node, a second node, a clock synchronization unit, a control unit, a switch unit, a feedback unit, a brightness setting device and a color sensing unit. An AC voltage is applied to the driving unit through the first node and the second node. The clock synchronization unit is coupled to the second node, using the AC input voltage as a reference for a clock synchronization signal. The control unit is coupled to the clock synchronization unit. The control unit converts a preset brightness value into an LED driver signal which is adjusted according to the clock synchronization signal timing and a feedback signal from the feedback unit. The control unit uses the clock synchronization signal to modulate the pulse width of the adjusting signal driver current based on the output signal from the feedback unit. The switch unit is coupled to the AC voltage, the driver current signal from the control unit, and the LED light source module. When the switch unit determines AC voltage is applied, and the driver current signal is applied from the control unit, current is applied to the LED light source module.

In one embodiment of the light source driving unit, the feedback unit is coupled between the light source module and the control unit to determine the load state of the light source module, and output a feedback signal to the control unit. In another embodiment, the light source module may be coupled to the AC power source and the switch unit. In this embodiment, the feedback unit may be coupled to the switch unit and the control unit.

In one embodiment, the light source driving unit contains a color sensing unit. The color sensing unit uses a light wavelength detector to determine the degree of illumination emitted by an LED light source. The detector outputs a signal, that corresponds to the degree of illumination (i.e. more illumination at a given wavelength means a higher voltage), to an amplifier. The amplifier amplifies the signal and transmits the signal to the control unit. The control unit then adjusts the LED driver current signal to produce the desired degree of illumination.

Also disclosed is a light source apparatus. The light source apparatus may include some or all of at least one LED string, a first node, a second node, a clock synchronization unit, a control unit, a switch unit, and a feedback unit. An AC voltage is applied to the light source apparatus through the first node and the second node. The clock synchronization unit is coupled to the second node, using the AC input voltage as a reference for a clock synchronization signal. The control unit is coupled to the clock synchronization unit. The control unit converts a preset brightness value into an LED driver current which is adjusted according to the clock synchronization signal timing and a feedback signal from the feedback unit. The control unit uses the clock synchronization signal to modulate the pulse width of the driver current based on the output signal from the feedback unit. The switch unit is coupled to the AC voltage, the driver current signal from the control unit, and the LED light source module. When the switch unit determines AC voltage is applied, and the driver current signal is applied from the control unit, current is applied to the LED light source module.

In one embodiment of the light source apparatus, the feedback unit is coupled between the light source module and the control unit to determine the load state of the light source module, and output a feedback signal to the control unit. In another embodiment, the light source module may be coupled to the AC power source and the switch unit. In this embodiment, the feedback unit may be coupled to the switch unit and the control unit.

The present invention uses a clock synchronization unit to generate a clock synchronization signal which is then input into the control unit. The control unit also receives a feedback signal from the feedback unit that is based on the output of the light source module. The control unit compares the feedback signal with the original preset intensity value. Based on the result of the comparison, the control unit adjusts the driving control signal to manipulate the brightness of the light source module to achieve the desired intensity. The adjusted driving control signal is applied to the switch unit and then corrects the intensity of the light source module.

In another embodiment, multiple LED strings can be used. Moreover, the LED strings may use different color LEDs. One example is three strings of LEDs, each of a different color such as red, green, and blue. Each LED string may use a separate LED driving circuit. In this embodiment, multiple color detectors may be used, or a single color detector may be used provided it is appropriately sensitive to the spectrum of colors used in the multiple LED strings.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments. In the drawings:

FIG. 5 is a timing diagram representing operation of the circuit shown in FIG. 4.

DETAILED DESCRIPTION

In the following description, for purposes of explanation and not limitation, specific techniques and embodiments are set forth, such as particular sequences of steps, interfaces and configurations, in order to provide a thorough understanding of the techniques presented herein. While the techniques and embodiments will primarily be described in context with the accompanying drawings, those skilled in the art will further appreciate that the techniques and embodiments can also be practiced in other circuit types.

Reference will now be made in detail to the exemplary embodiments of the invention, examples of which are illustrated in the accompanying drawings. Wherever possible, the same reference numbers will be used throughout the drawings to refer to the same or like parts.

Figure 1:
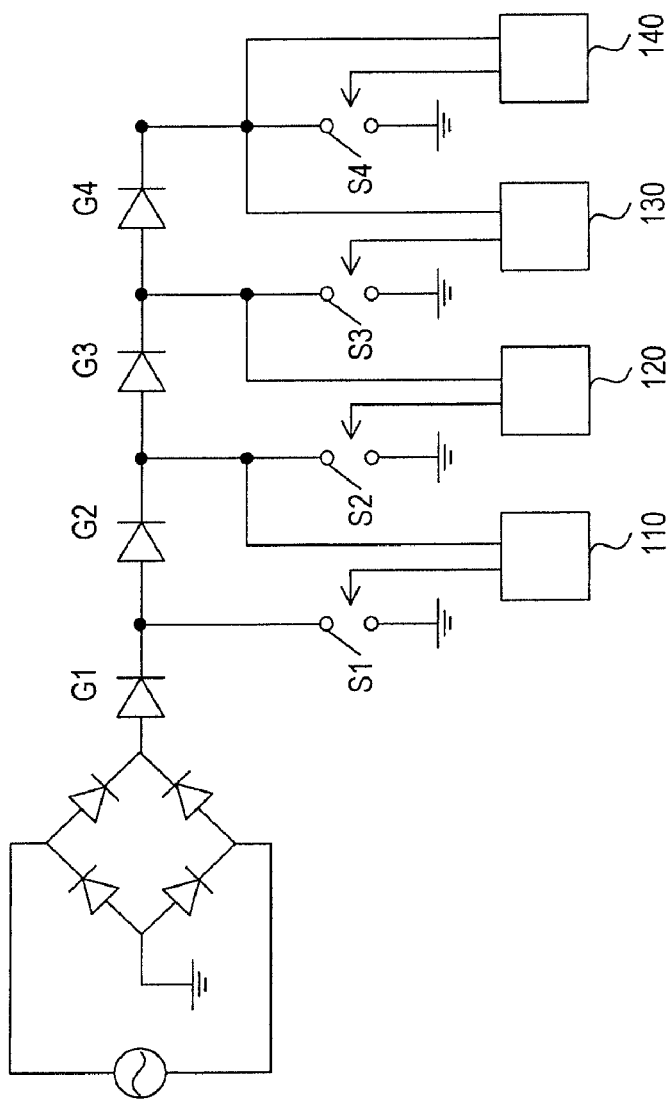
FIG. 1 is a conventional AC LED driver circuit diagram.
Figure 2:
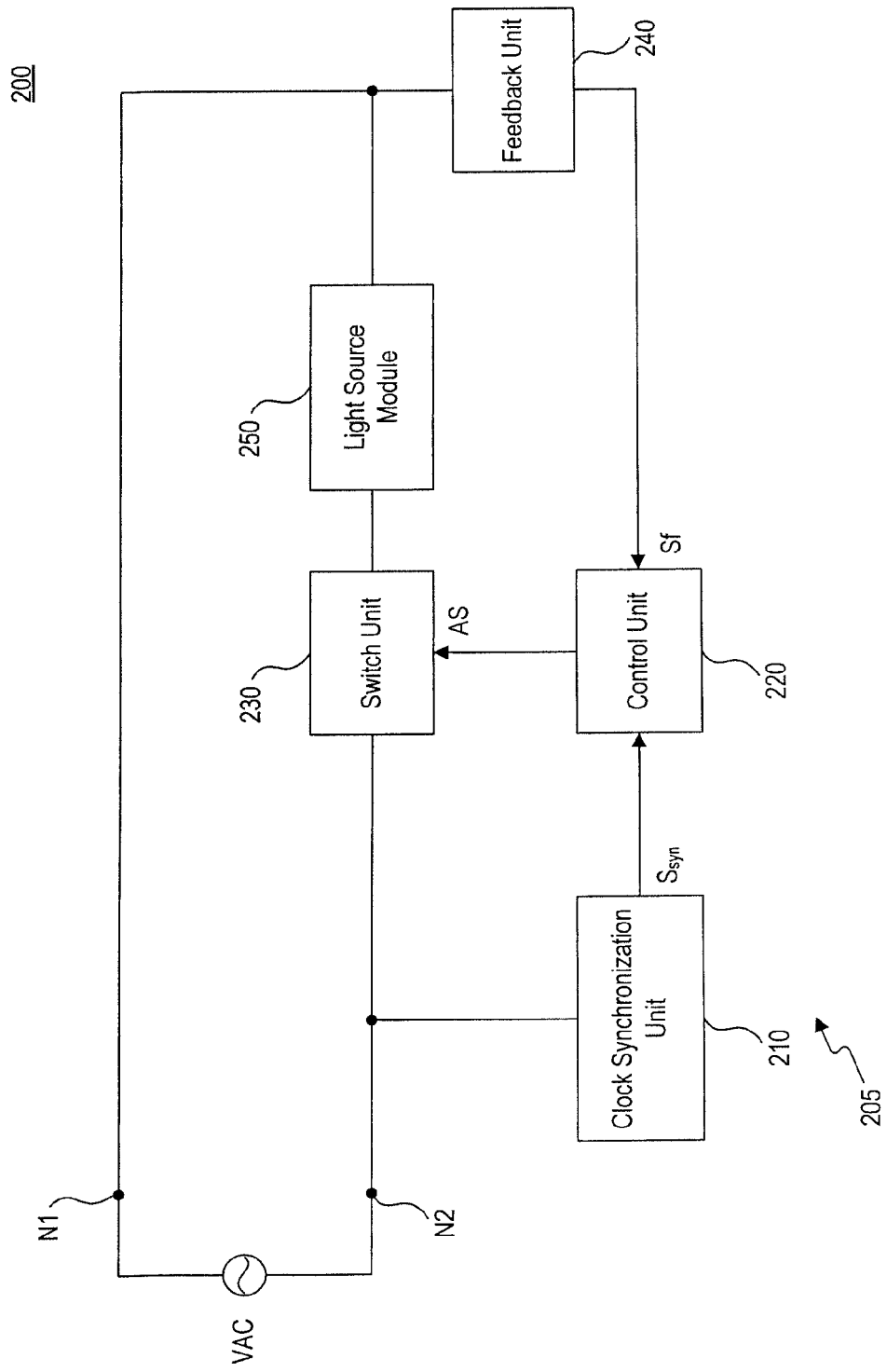
FIG. 2 is a block diagram of an embodiment of a light source apparatus including a light source driving unit.

FIG. 2 is a block diagram of an embodiment of a light source apparatus 200 including a light source driving unit 205. Light source driving unit 205 includes a first node N1, a second node N2, a clock synchronization unit 210, a control unit 220, a switch unit 230, and a feedback unit 240. An AC voltage VAC is applied to light source apparatus 200 through node N1 and node N2 to provide power to light source apparatus 200. Node N1 is coupled to a first end of a light source module 250. Clock synchronization unit 210 and switch unit 230 are coupled to node N2. Clock synchronization unit 210 uses AC voltage VAC to generate a clock synchronization signal Ssyn.

Clock synchronization signal Ssyn is output to control unit 220. Control unit 220 uses the timing of the clock synchronization signal Ssyn to generate an adjusting signal AS. Adjusting signal AS is output to switch unit 230. Switch unit 230 is coupled between node N2 and, a second end of light source module 250. Switch unit 230 determines whether or not AC voltage VAC is applied to light source module 250. For example, if adjusting signal AS is at a high logic voltage level, switch unit 250 will close to complete a circuit to thereby apply power to light source module 250. If adjusting signal AS is at a low logic voltage level, switch unit 250 will open to prevent light source module 250 from illuminating.

Feedback unit 240 is coupled between light source module 250 and control unit 220. Feedback unit 240 detects the presence of the electrical load, e.g. as magnitude of a current driving light source module 250 and, if a load is detected, outputs a feedback signal Sf corresponding to a magnitude of the driving current to control unit 220. Control unit 220 compares feedback signal Sf to a preset brightness value, that also corresponds to a driving current, that serves as a reference for modulating a pulse width of adjusting signal AS. For example, if feedback signal Sf has a brightness value that exceeds the preset brightness value, the pulse width of adjusting signal AS is modulated to be narrower to reduce a switching time in switch unit 230. If feedback signal Sf has a brightness value that is less than the preset brightness value, the pulse width of adjusting signal AS is modulated to be wider to increase the switching time in switch unit 230.

Figure 3:
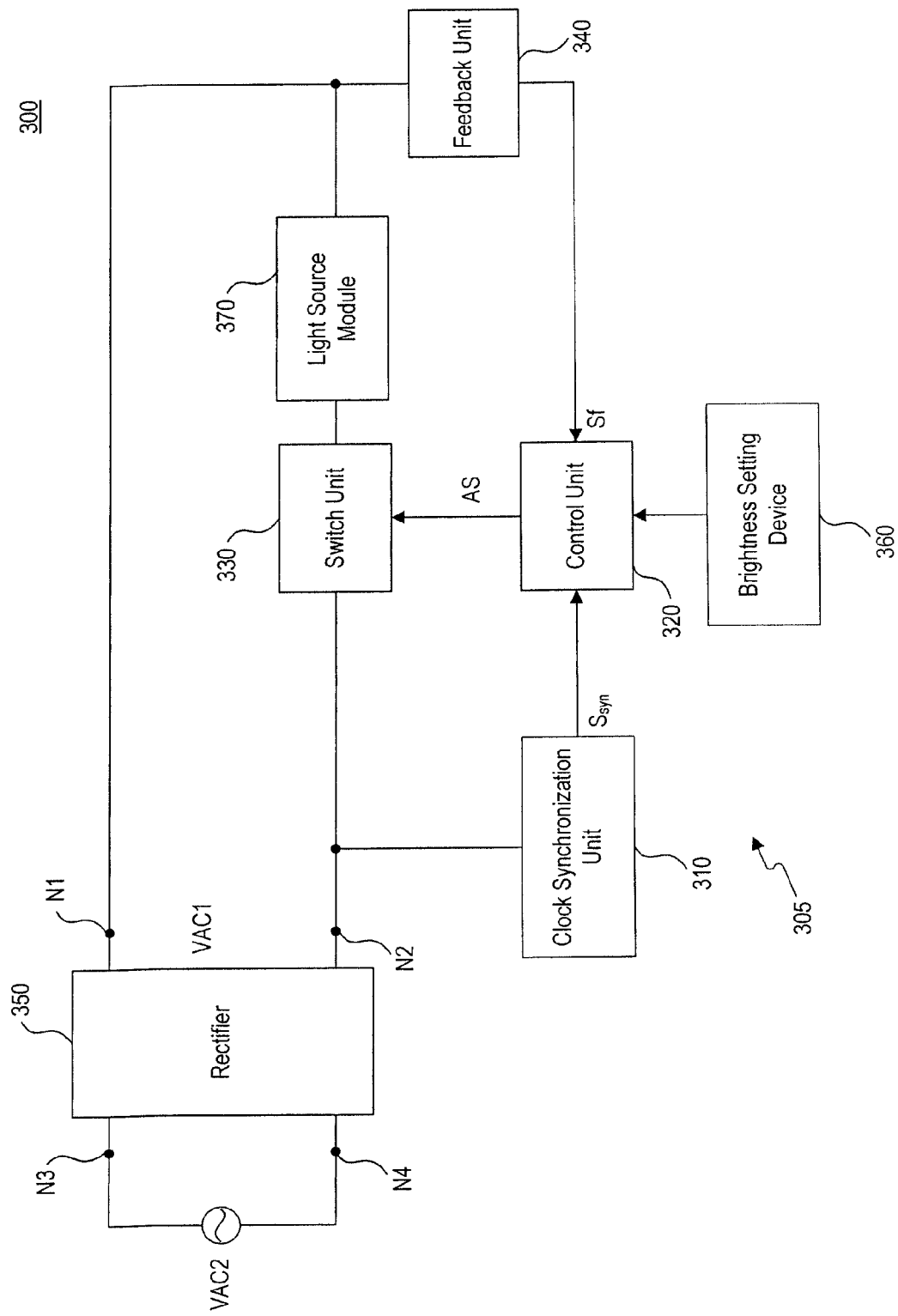
FIG. 3 is a block diagram of another embodiment of a light source apparatus including a light source driving unit.

FIG. 3 is a block diagram of another embodiment of a light source apparatus 300 including a light source driving apparatus 305. Referring to FIG. 3, light source driving unit 305 includes a clock synchronization unit 310, a control unit 320, a switch unit 330, a feedback unit 340, a rectifier 350, and an optional brightness setting device 360. An AC voltage VAC2 is applied to light source apparatus 300 through a third node N3 and a fourth node N4 to provide power to light source apparatus 300. Rectifier 350 converts AC voltage VAC2 into AC voltage VAC1. More particularly, it is sufficient for the present embodiments if rectifier 350 sufficiently rectifies voltage VAC2 to render it unipolar, but not to smooth the rectified voltage to eliminate ripple. As a result, AC voltage VAC1 still has a periodic variation in its waveform corresponding to the frequency of AC voltage VAC2. AC voltage VAC1 is applied to node N1 and node N2. Node N1 is coupled to a first, or cathode, end of a light source module 370.

Node N2 is coupled to clock synchronization unit 310 which uses AC voltage VAC1 to generate clock synchronization signal Ssyn. Clock synchronization unit 310 is coupled to control unit 320 which uses timing derived from clock synchronization signal Ssyn to output adjusting signal AS to switch unit 330. Switch unit 330, coupled to node N2 and a second, or anode, end of the light source module 370, receives adjusting signal AS and opens or closes the circuit according to a logical state of adjusting signal AS (i.e., high or low voltage). When switch unit 330 is closed, the circuit is closed and allows AC voltage VAC1 to be applied to light source module 350 to generate light. Feedback unit 340 is coupled to light source module 350 and control unit 320. Feedback unit 340 detects a load state of light source module 350 as, for example, a magnitude of current driving light source module 350. Feedback unit 340 outputs the detected load state by generating signal Sf, corresponding to the detected load state, which is provided to control unit 320.

In addition to feedback signal Sf, control unit 320 receives a preset brightness value from brightness setting device 360. The preset brightness value may be adjusted to suit individual lighting applications. Control unit 320 converts the preset brightness value to a value corresponding to a driving current, to enable comparison with feedback signal Sf. Once the preset brightness value is so converted, it is used as a reference for modulating adjusting signal AS. For example, if feedback signal Sf is greater than the preset brightness value, the pulse width of adjusting signal AS is modulated to be narrower. Conversely, if feedback signal Sf is less than the preset brightness value, the pulse width of adjusting signal AS is modulated to be wider. Control unit 320 transmits the modulated adjusting signal AS to open or close the circuit through switch unit 330. When the circuit is closed, AC voltage VAC1 is applied to light source module 370 to achieve the preset brightness value indicated by adjusting signal AS. In this embodiment, light source module 370 may be, for example, an LED string, plural sets of parallel LED strings, or one or more bulb strings. Light source module 370 may be used in illumination equipment, a source for backlight in an LCD module, and other lighting applications.

Figure 4:
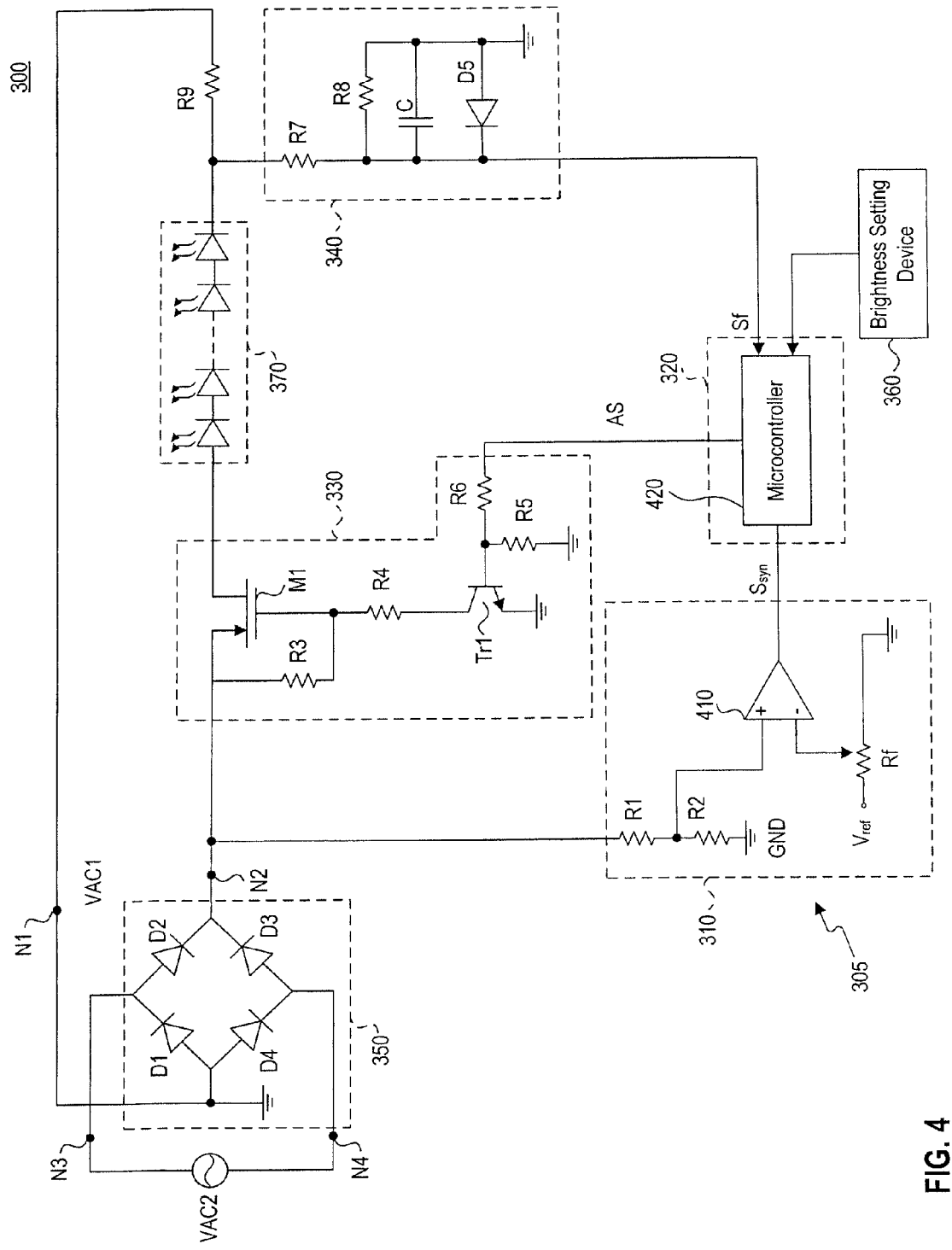
FIG. 4 is a diagram of a circuit embodying the light source apparatus including the light source driving unit shown in FIG. 3.

FIG. 4 is a diagram of a circuit embodying light source apparatus 300 and driving unit 305 of FIG. 3, for a case in which light source module 350 is provided as a single LED string. Light source apparatus 300 includes a resistor R9, as a current sensing resistor, placed between the first end of light source module 370 and node N1. The first end of light source module 370, is coupled to node N1 through resistor R9. The second end of light source module 370 is coupled to node N2 through switch unit 330. Switch unit 330 is thereby positioned to control whether or not AC voltage VAC1 is applied to light source module 350.

Clock synchronization unit 310 includes a first resistor R1, a second resistor R2, a variable resistor Rf, and a comparator 410. AC voltage VAC1 may be too large to input directly into comparator 410 without damaging comparator 410. To prevent such possible damage, resistors R1 and R2 are connected in series as a voltage divider, with AC voltage VAC1 applied to one end of resistor R1 through node N2. Resistor R2 is connected to the other end of resistor R1 and a reference voltage, e.g., a ground voltage GND. The voltage on resistor R2 is applied to a first input, e.g., a positive input of comparator 410.

The first and second ends of variable resistor Rf are coupled to a reference voltage Vref and voltage GND, respectively. A selected voltage on variable resistor Rf is provided to a second input, e.g., the negative input end, of comparator 410. Comparator 410 compares the respective voltages on its first and second inputs. The result of the comparison is output as clock synchronization signal Ssyn on an output of comparator 410. In some embodiments of the present invention, the magnitude of reference voltage Vref, or the resistance value of variable resistor Rf, may be changed to adjust the voltage level on the second input of comparator 410 for specific applications. Changing the voltage level on the second input of comparator 410 adjusts the pulse width of clock synchronization signal Ssyn.

Control unit 320 includes a microcontroller 420. Microcontroller 420 receives clock synchronization signal Ssyn and uses signal Ssyn, in part, to generate adjusting signal AS. Adjusting signal AS is output from microcontroller 420 for input to switch unit 330. Switch unit 330 opens or closes the circuit providing VAC1 to light source module 370 based on the logic voltage level of the input adjusting signal AS, i.e., whether the voltage of adjusting signal AS is high or low.

Switch unit 330 includes a transistor M1, a third resistor R3, a fourth resistor R4, a transistor Tr1, a fifth resistor R5, and a sixth resistor R6. The drain and the source of transistor M1 are coupled to the second end of light source module 370 and node N2, respectively. First and second ends of resistor R3 are coupled to the source of transistor M1 and the gate of transistor M1, respectively. Resistor R4 is coupled to the gate of transistor M1 and the collector of transistor Tr1. The emitter of transistor Tr1 is coupled to voltage GND. Resistor R5 is coupled between the base of transistor Tr1 and voltage GND. Resistor R6 is coupled between an end of resistor R5 and microcontroller 420.

In one embodiment, if microcontroller 420 provides a high logic voltage as adjusting signal AS to transistor Tr1, transistor Tr1 is turned on. Upon being turned on, transistor Tr1 conducts current which causes the gate of transistor M1 to be electrically connected to voltage GND through resistor R4, causing transistor M1 to be turned on. When transistor M1 is turned on, AC voltage VAC1 is applied to light source module 370 to generate illumination. If microcontroller 420 provides adjusting signal AS as a low logic voltage, transistor Tr1 is not turned on, which in turn prevents transistor M1 from conducting AC voltage VAC1 to light source module 370. When AC voltage VAC1 is not applied to light source module 370, there is no illumination.

In yet another embodiment, transistor M1 may be, for example, a PMOS transistor and transistor Tr1 may be a bipolar junction transistor. Resistors R3, R4, R5, and R6 may be used as current limiting resistors to protect transistor M1 and transistor Tr1 from damage.

Feedback unit 340 includes a seventh resistor R7, an eighth resistor R8, a capacitor C, and a fifth diode D5. Resistor R7 is coupled at its first end to light source module 370. Feedback signal Sf is provided on the second end of resistor R7. Eighth resistor R8, and capacitor C are coupled between the second end of resistor R7 and the voltage GND (e.g. the ground voltage). Diode D5 is coupled in parallel with resistor R8 and capacitor C, and is oriented such that its anode is coupled to voltage GND and its cathode is coupled to the second end of resistor R7. Feedback unit 340 may be provided as a discrete integrating circuit. By such integration, feedback unit 340 converts the current that drives light source module 370 into feedback signal Sf that represents an average value of the driving current. Feedback signal Sf is transmitted to microcontroller 420 of control unit 320.

In one embodiment, rectifier 350 may be implemented as a bridge rectifier. Persons of ordinary skill in the art will now appreciate that other methods may be used to implement rectifier 350 as required by a specific application of the present invention. The bridge rectifier in the embodiment shown in FIG. 4 includes a first diode D1, a second diode D2, a third diode D3, and a fourth diode D4. AC voltage VAC2 is applied to the rectifier through node N3 and node N4. The anode end of diode D1 is coupled to node N1 and the cathode end of diode D1 is coupled to node N3. The anode end of diode D2 is coupled to node N3, and the cathode end of diode D2 is coupled to node N2. The anode end of diode D3 is coupled to node N4, and the cathode end of diode D3 is coupled to node N2. The anode end of diode D4 is coupled to the anode end of D1, and the cathode end of diode D4 is connected to fourth node N4. In this embodiment, node N1 may be grounded. The output waveform of the bridge rectifier has a periodic variation in its waveform corresponding to the frequency of AC voltage VAC2.

FIGS. 5(A)-5(D) are timing diagrams representing operation of the circuit shown in FIG. 4. The timing diagrams in FIGS. 5(A)-5(D) represent waveforms for AC voltage VAC1, the portion of reference signal Vref applied to comparator 410 through adjustable resistor Rf, clock synchronization signal Ssyn, adjusting signal AS, and feedback signal Sf, respectively. Referring now to FIGS. 4 and 5(A)-5(D), AC voltage VAC2 is applied to rectifier 350 through node N3 and node N4. Rectifier 350 converts AC voltage VAC2 into AC voltage VAC1 as shown in FIG. 5(A).

AC voltage VAC1 is divided by resistors R1 and R2 in clock synchronization unit 310. The voltage on resistor R2 is provided to a positive input of comparator 410. The voltage on resistor Rf is provided to a negative input of comparator 410 as shown in FIG. 5(A). Comparator 410 compares the voltages on its positive and negative inputs and generates clock synchronization signal Ssyn, as shown in FIG. 5(B). Clock synchronization signal Ssyn is provided to microcontroller 420.

Microcontroller 420 generates adjusting signal AS based on the inputted clock synchronization signal Ssyn and feedback signal Sf. Adjusting signal AS is shown in FIG. 5(C). A high logic voltage output from microcontroller 420 provided to switch unit 330 causes switch unit 330 to close the circuit. Once the circuit is closed, AC voltage VAC1 is input to light source module 370 causing illumination. Feedback unit 340 detects the driving current in light source module 370, as shown in FIG. 5(D), and produces an average value of the driving current, as shown by the dashed line in FIG. 5(D), using the integrating circuit within feedback unit 340. The average driving current value is transmitted to microcontroller 420 in control unit 320 as feedback signal Sf.

Microcontroller 420 acquires a preset brightness value from brightness setting device 360. Microcontroller 420 converts this preset value into a driving current value and compares that converted value with feedback signal Sf to generate a reference for modulating adjusting signal AS. For example, if feedback signal Sf is greater than the preset brightness value, i.e., light from light source module 370 is relatively bright, microcontroller 420 modulates the pulse width W of adjusting signal AS to be narrower. If feedback signal Sf is less than the preset brightness value, i.e., light from light source module 370 is relatively dim, microcontroller 420 modulates the pulse width W of adjusting signal AS to be wider. Adjusting signal AS, as modulated, is transmitted to switch unit 330. Switch unit 330 selectively applies AC voltage VAC1 to light source module 370 according to the pulse width w of adjusting signal AS and selectively drives light source module 370 to achieve the preset brightness value.

Embodiments consistent with the present invention may also be practiced to drive plural sets of light source modules. For example, embodiments consistent with the present invention may be practiced to adjust the brightness of an LCD backlight module. In accordance with such embodiments, any or all of brightness, color, contrast, intensity, frequency, or other properties of the light source modules may be manipulated using commonly available LEDs. For example, the brightness of RGB (red, green, and blue LEDs) in a backlight module may be adjusted, as shown in the following embodiment illustrated in FIGS. 6-8.

Figure 6:
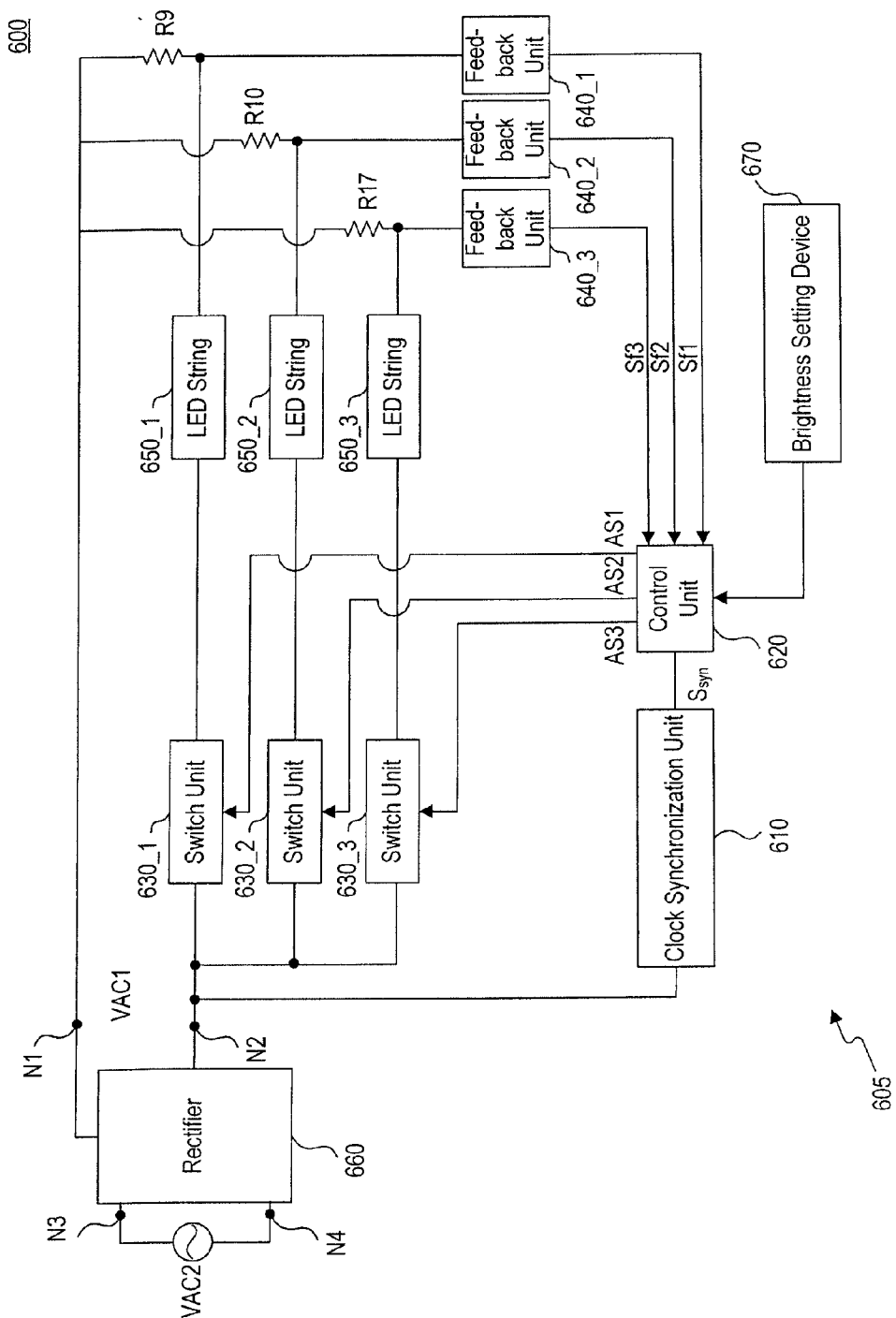
FIG. 6 is a block diagram of another embodiment of a source apparatus including a light source driving unit.

FIG. 6 is a block diagram of a light source apparatus 600 including a driving apparatus 605 according to an embodiment of the present invention. Driving apparatus 605 includes a clock synchronization unit 610, a control unit 620, switch units 630_1-630_3, feedback units 640_1-640_3, LED strings 650_1-650_3, a rectifier 660, a brightness setting device 670, a ninth resistor R9, a tenth resistor R10, and a seventeenth resistor R17. LED strings 650-1-650_3 may be red, green, and blue LEDs strings, respectively.

Resistor R9 serves as a current sensing resistor and is coupled between a first end of LED string 650_1 and node N1. Resistors R10 and R17 similarly serve as current sensing resistors and are coupled between LED strings 650_2 and 650_3, respectively, and node N1. AC voltage VAC2 is applied to rectifier 660 through node N3 and node N4. Rectifier 660 converts AC voltage VAC2 into AC voltage VAC1 between nodes N1 and N2. AC voltage VAC1 is provided as input to clock synchronization unit 610 via node N2. Clock synchronization unit 610 uses AC voltage VAC1 to generate clock synchronization signal Ssyn.

Clock synchronization signal Ssyn is provided by clock synchronization unit 610 as input for control unit 620. Control unit 620 is responsive to signal Ssyn and other inputs described below, to generate and output adjusting signals AS1-AS3 to each of corresponding switch units 630_1-630_3, respectively. Switch units 630_1-630_3 selectively apply AC voltage VAC1 to LED strings 650_1-650_3, based on the logic voltage levels and pulse widths of adjusting signals AS1-AS3, respectively, to generate light. Feedback units 640_1-640_3 are respectively coupled to LED strings 650_1-650_3 and detect a load, i.e., magnitude of the driving current, on LED current strings 650_1-650_3, respectively. Depending on the detected load state of LEDs 650_1-650_3, feedback units 640_1-640_3 generate feedback signals Sf1-Sf3, respectively, which are provided to control unit 620.

In response to feedback signals Sf1-Sf3, control unit 620 determines the brightness of light emitted from LEDs 650_1-650_3. Control unit 620 compares feedback signals Sf1-Sf3 to a preset brightness value, stored in brightness setting device 670, that is representative of a driving current. The results of the comparisons of the preset brightness values and feedback signals are used as references for modulating the pulse widths of adjusting signals AS1-AS3. Adjusting signals AS1-AS3 are provided to switch units 630_1-630_3 to control application of AC voltage VAC1 to LED strings 650_1-650_3 to achieve the preset brightness values.

Figure 7:
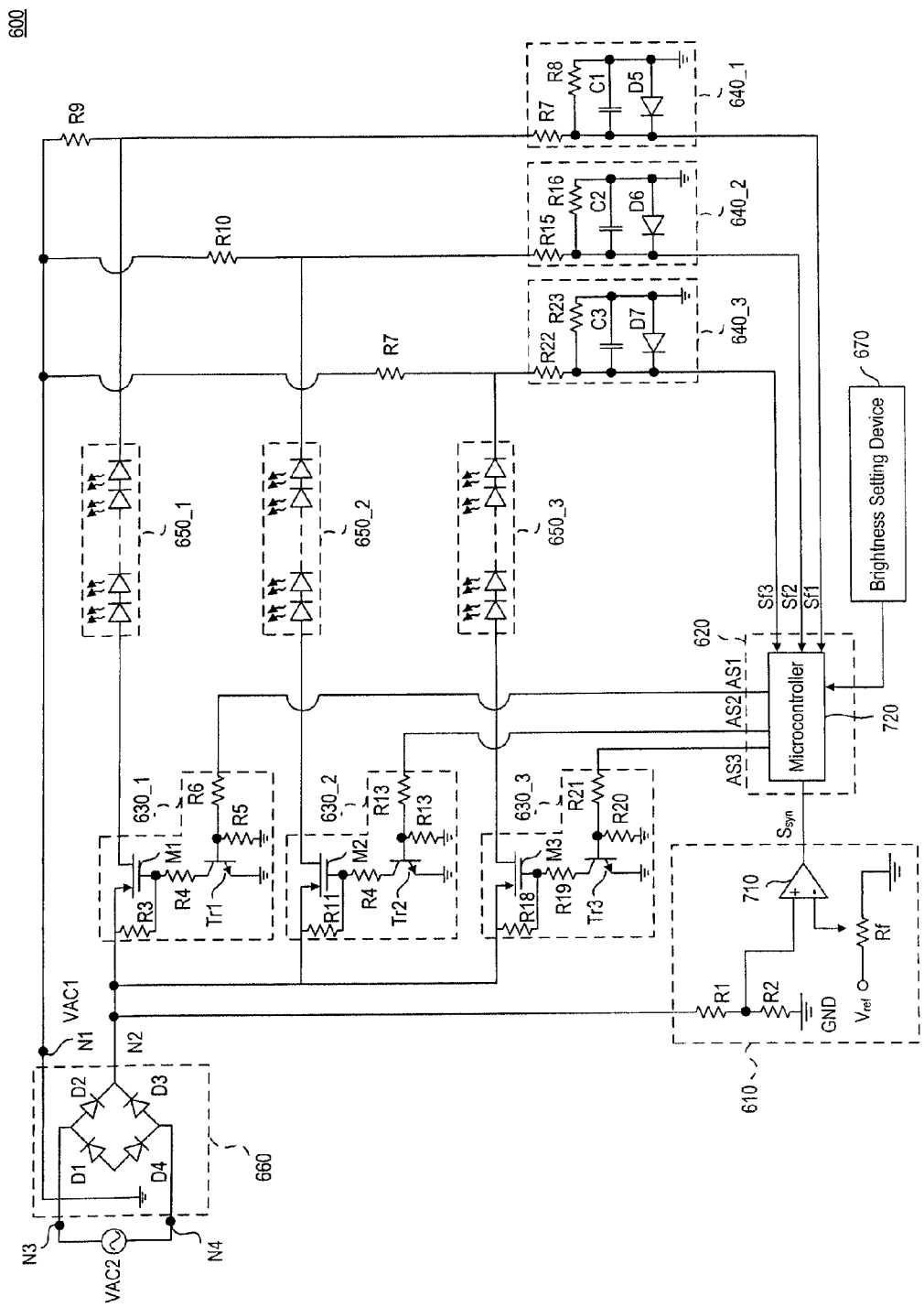
FIG. 7 is a diagram of a circuit embodying the light source apparatus including the light source driving unit shown in FIG. 6.
Figure 8:
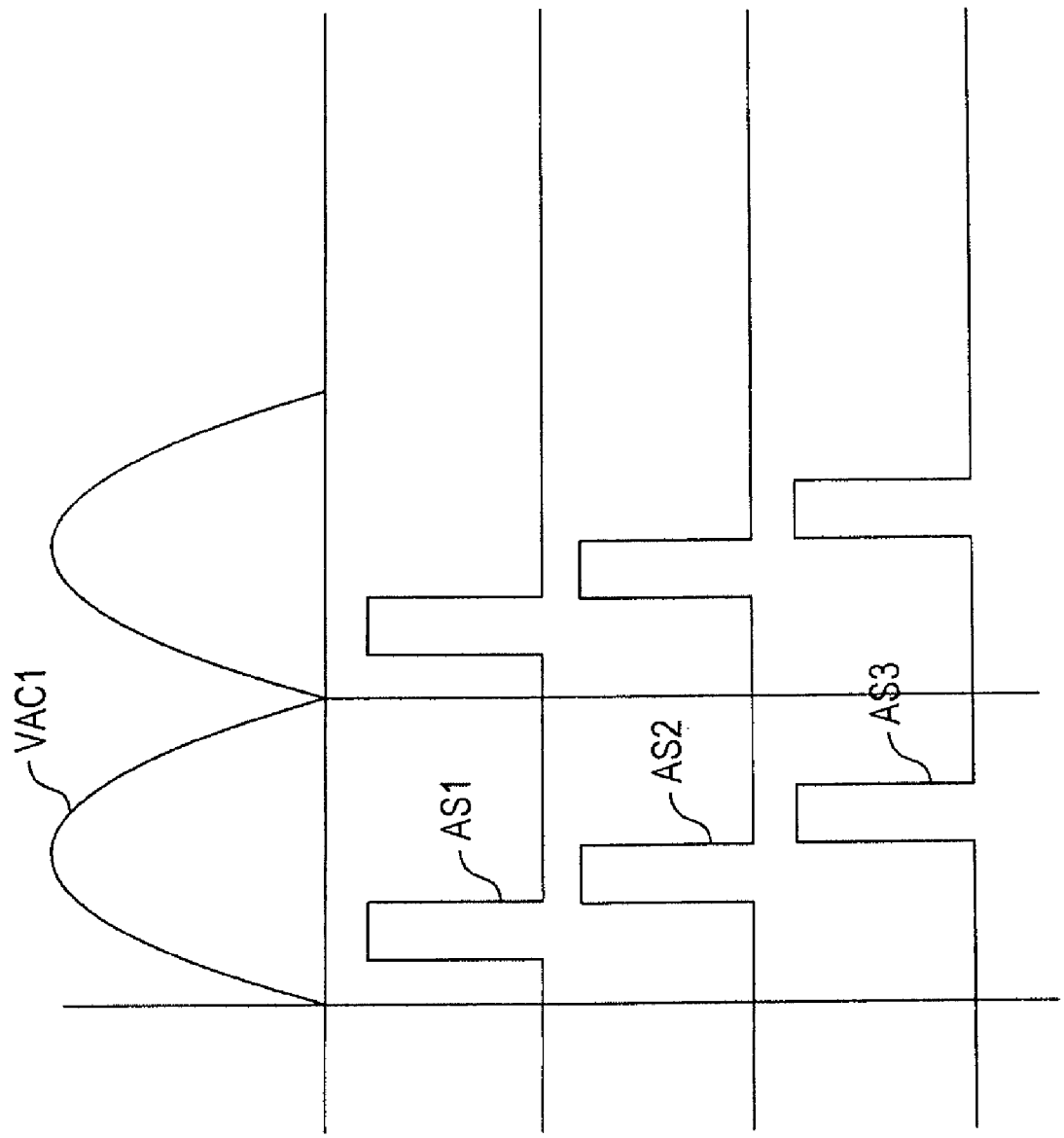
FIG. 8 is a timing diagram of an LED string according to the embodiment shown in FIG. 7.

FIG. 7 is a diagram of a circuit embodying the light source apparatus 600 and the driving apparatus 605 of FIG. 6. Referring to FIG. 7, clock synchronization unit 610, control unit 620, and rectifier 660 may be generally implemented as described in the embodiment shown in FIG. 4. As shown in FIG. 7, clock synchronization unit 610 includes a comparator 710 but is otherwise configured the same as clock synchronization unit 310. Control unit 620 includes a microcontroller 720.

In the present embodiment, rectifier 660 is implemented as a bridge rectifier. However, persons of ordinary skill in the art will now appreciate that rectifier 660 may be implemented by other circuit configurations as required by a specific application.

Switch unit 630_1 is configured the same as switch unit 330 as shown in FIG. 4 and includes first transistor M1, third resistor R3, fourth resistor R4, second transistor Tr1, fifth resistor R5, and sixth resistor R6. The drain of transistor M1 is coupled to one end of LED string 650_1. Resistor R3 is coupled between the source and gate of transistor M1. Resistor R4 is coupled at one end to the gate of transistor M1. The other end of resistor R4 is coupled to the collector of transistor Tr1. The emitter of transistor Tr1 is coupled to voltage GND, e.g., the ground voltage. Resistor R5 is coupled to the base of transistor Tr1 and the voltage GND. Resistor R6 is coupled to resistor R5 and the base of transistor Tr1 on one end, and control unit 620 at the other end. In the present embodiment, transistor M1 may be a PMOS transistor, and transistor Tr1 may be an NPN bipolar junction transistor.

Switch unit 630_2 includes a second transistor M2, an eleventh resistor R11, a twelfth resistor R12, a fourth transistor Tr2, a thirteenth resistor R13, and a fourteenth resistor R14. The drain of transistor M2 is coupled to one end of LED string 650_2. Resistor R11 is coupled between the source and gate of transistor M2. Resistor R12 is coupled at one end to the gate of transistor M2. The other end of resistor R12 is coupled to the collector of transistor Tr2. The emitter of transistor Tr2 is coupled to voltage GND, e.g., the ground voltage. Resistor R13 is coupled to the base of transistor Tr2 and the voltage GND. Resistor R14 is coupled to resistor R13 and the base of transistor Tr2 on one end, and control unit 620 at the other end. In the present embodiment, transistor M2 may be a PMOS transistor, and transistor Tr2 may be an NPN bipolar junction transistor.

Switch unit 630_3 includes a fifth transistor M3, an eighteenth resistor R18, a nineteenth resistor R19, a sixth transistor Tr3, a twentieth resistor R20, and a twenty-first resistor R21. The drain of transistor M3 is coupled to one end of LED string 650_3. Resistor R18 is coupled between the source and gate of transistor M3. Resistor R19 is coupled at one end to the gate of transistor M3. The other end of resistor R19 is connected to the collector of transistor Tr3. The emitter end of transistor Tr3 is coupled to voltage GND, e.g., the ground voltage. Resistor R20 is coupled to the base of transistor Tr3 and the second GND. Resistor R21 is coupled to resistor R20 and the base of transistor Tr3 at one end, and control unit 620 at the other. In the present embodiment, transistor M3 may be a PMOS transistor, and transistor Tr3 may be an NPN bipolar junction transistor.

Feedback unit 640_1 includes a seventh resistor R7, an eighth resistor R8, a first capacitor C1, and a fifth diode D5. One end of resistor R7 is coupled to LED string 650_1 while the other end is coupled to microcontroller 720 as an input for feedback signal Sf1. Resistor R8 is coupled between the other end of R7 and voltage GND, e.g., the ground voltage. Capacitor C1 is coupled in parallel with resistor R8. The anode end of diode D5 is coupled to voltage GND while the cathode end of diode D5 is coupled to the other end of resistor R7.

Feedback unit 640_2 includes a fifteenth resistor R15, a sixteenth resistor R16, a second capacitor C2, and a sixth diode D6. One end of resistor R15 is coupled to LED string 650_2 while the other is coupled to microcontroller 720 as an input for feedback signal Sf2. Resistor R16 is coupled between the other end of R15 and voltage GND, e.g., the ground voltage. Capacitor C2 is coupled in parallel with resistor R16. The anode end of diode D6 is coupled to voltage GND while the cathode end of diode D6 is coupled to the other end of resistor R15.

Feedback unit 640_3 includes a twenty-second resistor R22, a twenty-third resistor R23, a third capacitor C3, and a seventh diode D7. One end of resistor R22 is coupled to LED string 650_3 while the other is coupled to microcontroller 720 as an input for feedback signal Sf3. Resistor R23 is coupled between the other end of R22 and voltage GND, e.g., the ground voltage. Capacitor C3 is coupled in parallel with resistor R23. The anode end of diode D7 is coupled to voltage GND while the cathode end of diode D7 is coupled to the other end of resistor R22. Feedback units 640_1-640_3 operate in a manner consistent with that of feedback unit 340 as shown in FIG. 4 and described above.

FIGS. 8(A)-8(D) are timing diagrams representing operation of the circuit shown in FIG. 7. The operation of light source apparatus 600, configured as shown in FIG. 7, is described next with reference to voltage VAC1 and signal waveforms AS1-AS3, shown in FIGS. 8(A)-(D), respectively. FIG. 7 shows AC voltage VAC2 is applied to rectifier 660 through node N3 and node N4. Voltage VAC2 is rectified by rectifier 660 into AC voltage VAC1. The waveform representing AC voltage VAC1 is shown in FIG. 8(A). In response to the input clock synchronization signal Ssyn, microcontroller 720 outputs adjusting signals AS1-AS3 shown in FIG. 8(B)-8(D), to switch units 630_1-630_3, respectively. Switch units 630_1-630_3 apply AC voltage VAC1 to LED strings 650_1-650_3 based on the inputs from adjusting signals AS1-AS3, respectively. When AC voltage VAC1 is applied to each of LED strings 650_1-650_3, light is emitted. Feedback units 640_1-640_3 detect a driving current driving each of LED strings 650_1-650_3 and generate feedback signals Sf1-Sf3, respectively. Feedback signals Sf1-Sf3 are provided to microcontroller 720.

Microcontroller 720 acquires preset brightness values, representative of driving currents, from brightness setting device 670, which it compares with feedback signals Sf1-Sf3. Microcontroller 720 uses the results of the comparisons of the preset brightness values with feedback signals Sf1-Sf3 as references for modulating adjusting signals AS1-AS3. Adjusting signals AS1-AS3 are provided by microcontroller 720 to control switch units 630_1-630_3 to selectively apply AC voltage VAC1 to LED strings 650_1-650_3 to achieve the preset brightness values, respectively.

Figure 9:
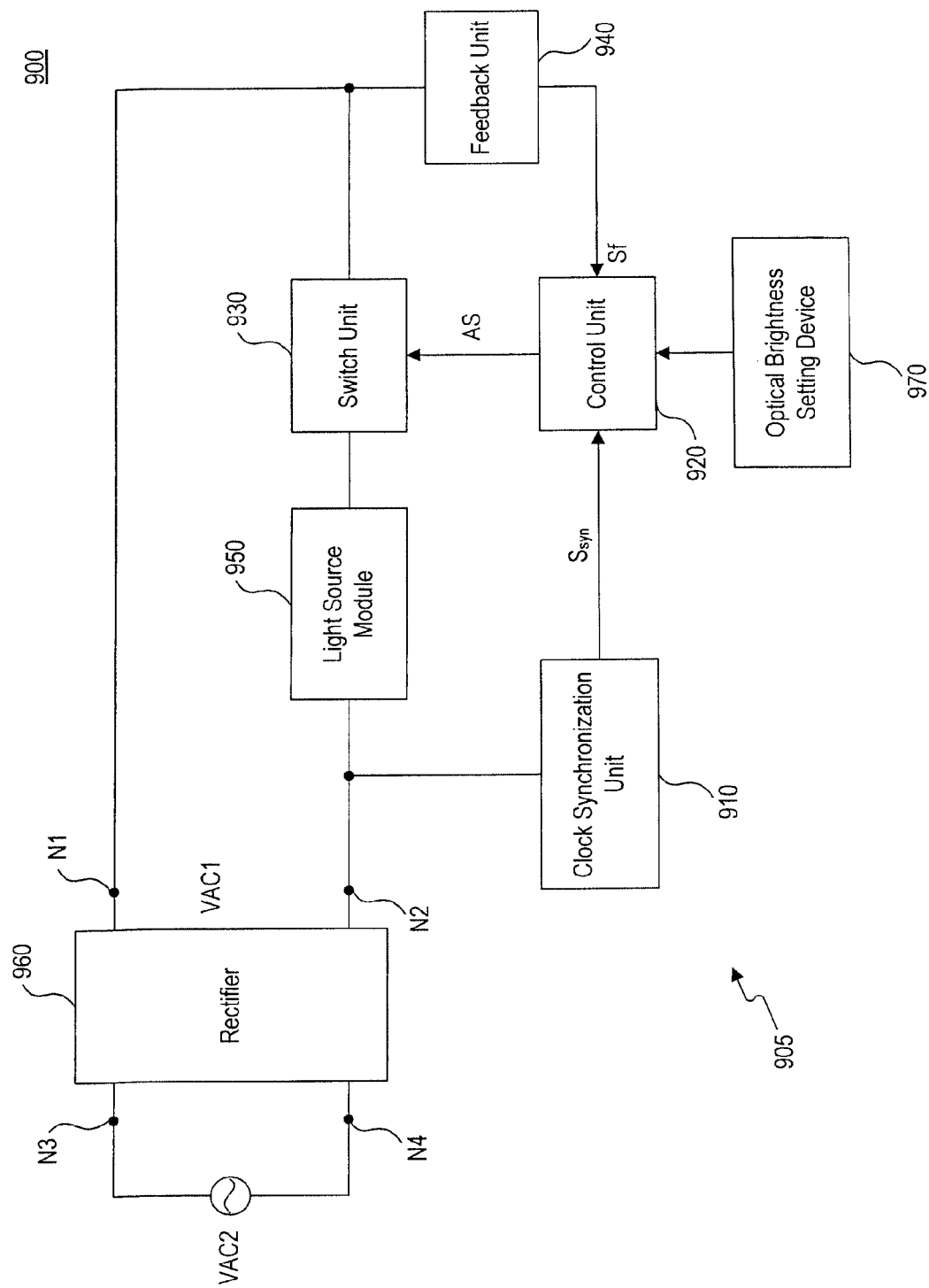
FIG. 9 is a block diagram of another embodiment of a light source apparatus including a light source driving unit.

FIG. 9 is a block diagram of a light source apparatus 900 including a driving apparatus 905 according to an embodiment of the present invention. Referring to FIG. 9, light source apparatus 900 includes a clock synchronization unit 910, a control unit 920, a switch unit 930, a feedback unit 940, a light source module 950, a rectifier 960, and an optional brightness setting device 970. An AC voltage VAC2 is applied to light source apparatus 900 through node N3 and node N4 to provide power to light source apparatus 900. Rectifier 960 converts AC voltage VAC2 into AC voltage VAC1. AC voltage VAC1 is applied to node N1 and node N2. Node N1 is coupled to a first end of switch unit 930.

Node N2 is coupled to a first end of light source module 950 and to clock synchronization unit 910. Clock synchronization unit 910 is responsive to AC voltage VAC1 to generate clock synchronization signal Ssyn. Control unit 920 is coupled to clock synchronization unit 910 to receive clock synchronization signal Ssyn and generate adjusting signal AS, which is provided to switch unit 930. Switch unit 930, coupled to a second end of light source module 950 and to first node N1, receives adjusting signal AS and opens or closes the circuit according to the logic state and pulse width of adjusting signal AS. When switch unit 930 is closed, the circuit is closed and allows AC voltage VAC1 to be conducted through light source module 350 and switch unit 330 to generate light. Feedback unit 940 is coupled between switch unit 930 and control unit 920. Feedback unit 340 detects the load state of light source module 950, e.g., a magnitude of the current driving light source module 950. Feedback unit 940 outputs signal Sf, representative of the load state determination, to control unit 920.

In addition to feedback signal Sf, control unit 920 receives a preset brightness value from optical brightness setting device 970. The preset brightness value may be adjusted to suit individual lighting applications. Control unit 920 converts the preset brightness value into a signal representative of a driving current for use in comparing with feedback signal Sf. Control unit 920 uses the converted preset brightness value as a reference for modulating adjusting signal AS. For example, if feedback signal Sf is greater than the converted preset brightness value, the pulse width of adjusting signal AS is modulated to be narrower. Conversely, if feedback signal Sf is less than the converted preset brightness value, the pulse width of adjusting signal AS is modulated to be wider. Control unit 920 transmits the modulated adjusting signal AS to open or close the circuit by means of switch unit 930. When the circuit is closed, AC voltage VAC1 is applied to light source module 950 to achieve the preset brightness value indicated by adjusting signal AS. In this embodiment, light source module 950 may be, for example, an LED string, plural sets of parallel LED strings, or a bulb string.

Figure 10:
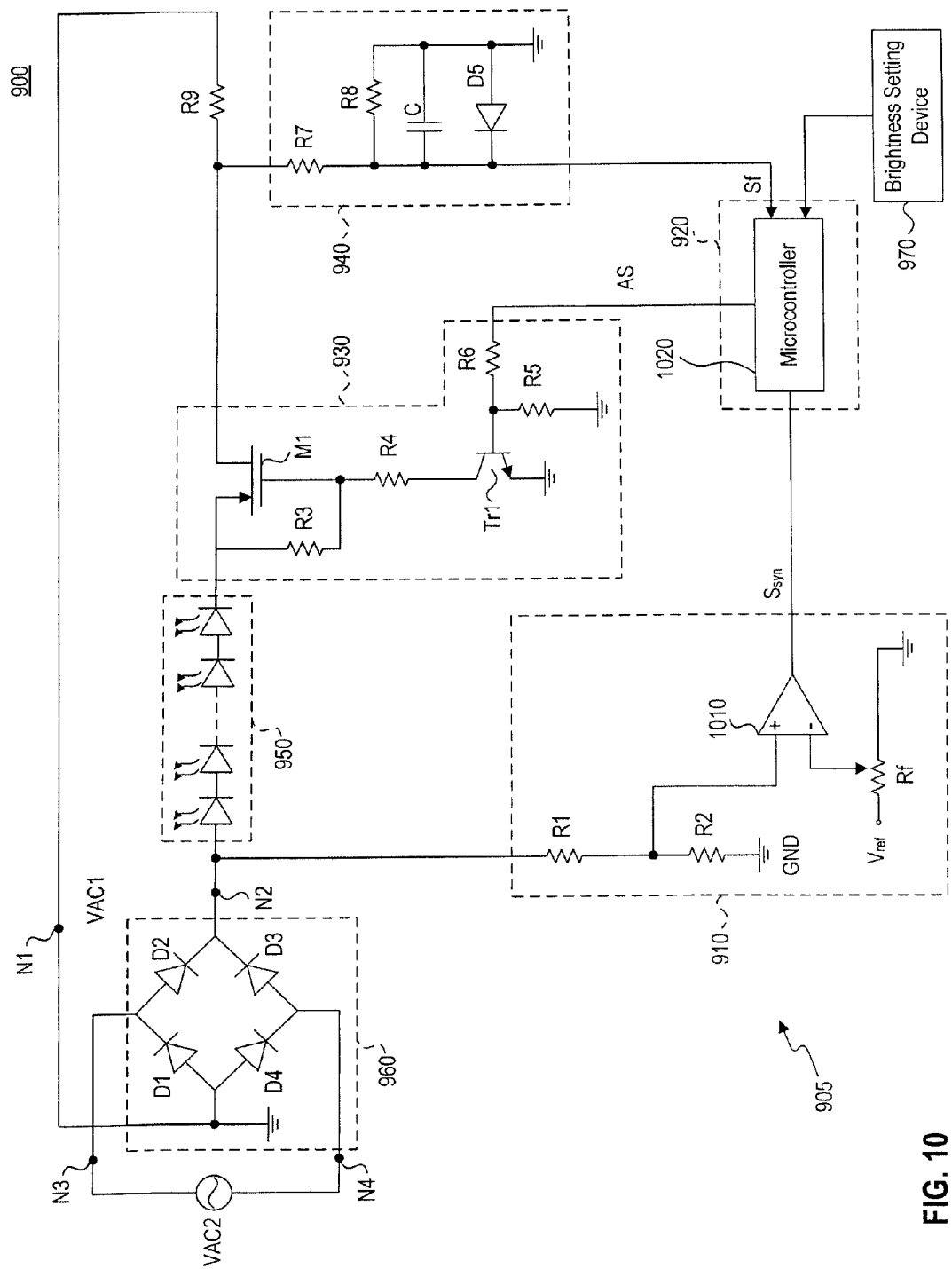
FIG. 10 is a diagram of a circuit embodying the light source apparatus including the light source driving unit shown in FIG. 9.

FIG. 10 is a diagram of a circuit embodying of the light source apparatus 900 and the driving apparatus 905 of FIG. 9. FIG. 10 illustrates a light source module 950 provided as an LED string. The circuit shown in FIG. 10, is configured similarly to the circuit shown in FIG. 4 such that many elements of the two circuits bear the same designations. Light source apparatus 900 includes resistor R9, as a current sensing resistor, disposed between the first end of switch unit 930 and node N1. The anode of light source module 950 is coupled to node N2. A second end of switch unit 930 is coupled to the cathode end of light source module 950. Switch unit 930 therefore controls whether or not AC voltage VAC1 is applied to light source module 950.

The clock synchronization unit 910 includes first resistor R1, second resistor R2, variable resistor Rf, and a comparator 1010, generally configured the same as the corresponding elements of clock synchronization unit 310 shown in FIG. 4. It is possible that AC voltage VAC1 may be too large to input directly into comparator 1010 without damaging comparator 1010. To prevent such possible damage, resistors R1 and R2 are connected in series as a voltage divider. AC voltage VAC1 is applied to one end of resistor R1 through node N2. Resistor R2 is coupled between the opposite end of resistor R1 and second voltage GND, e.g., a ground voltage. The voltage on resistor R2 is transmitted to a first input, e.g., a positive input, of comparator 1010.

Variable resistor Rf is coupled between reference voltage Vref and voltage GND, e.g., the ground voltage. The voltage on variable resistor Rf is coupled to a second input, e.g., the negative input, of comparator 1010. Comparator 1010 compares the voltages on its first and second inputs and outputs a result of the comparison as clock synchronization signal Ssyn. In some embodiments of the present invention, the magnitude of reference voltage Vref, or the resistance value of variable resistor Rf, may be changed to manipulate the voltage level input on the second input of comparator 1010 for specific applications. The variation of the voltage level on the second input of comparator 1010 varies the pulse width of clock synchronization signal Ssyn.

Control unit 920 includes a microcontroller 1020. Microcontroller 1020 receives clock synchronization signal Ssyn as one of several inputs for use in generating adjusting signal AS. Adjusting signal AS is output from microcontroller 1020 as an input to switch unit 930. Switch unit 930 opens or closes the circuit based on the voltage level and pulse width of adjusting signal AS. Switch unit 930 is configured the same as switch unit 330 shown in FIG. 4.

In the present embodiment, if control unit 920 provides adjusting signal AS as a high logic voltage to transistor Tr1, transistor Tr1 is turned on. When turned on, transistor Tr1 conducts current which causes transistor M1 to be turned on such that the gate of transistor M1 is electrically coupled to voltage GND, e.g., the ground voltage, through fourth resistor R4. When transistor M1 is turned on, AC voltage VAC1 is applied across light source module 950 which causes module 950 to conduct current and generate illumination. If control unit 920 provides adjusting signal AS as a low logic voltage, transistor Tr1 is not turned on, which in turn causes transistor M1 to turn off and not apply AC voltage VAC1 across light source module 950. When transistor M1 is open and voltage VAC1 is not applied across light source module 950, the module does not conduct current and no illumination is generated.

In the present embodiment, transistor M1 may be, for example, a PMOS transistor and transistor Tr1 may be an NPN bipolar junction transistor. Resistors R3, R4, R5, and R6 may be used as current limiting resistors to prevent the flow of excessively large current magnitudes that may otherwise damage transistor M1 or transistor Tr1.

Feedback unit 940 is configured the same as feedback unit 340 shown in FIG. 4. In one embodiment, rectifier 960 may be implemented as a bridge rectifier. Persons of ordinary skill in the art will now appreciate that other methods may be used to implement rectifier 960 as required by a specific application. The bridge rectifier in the embodiment shown in FIG. 10 is configured the same as the bridge rectifier shown in FIG. 4.

Figure 11:
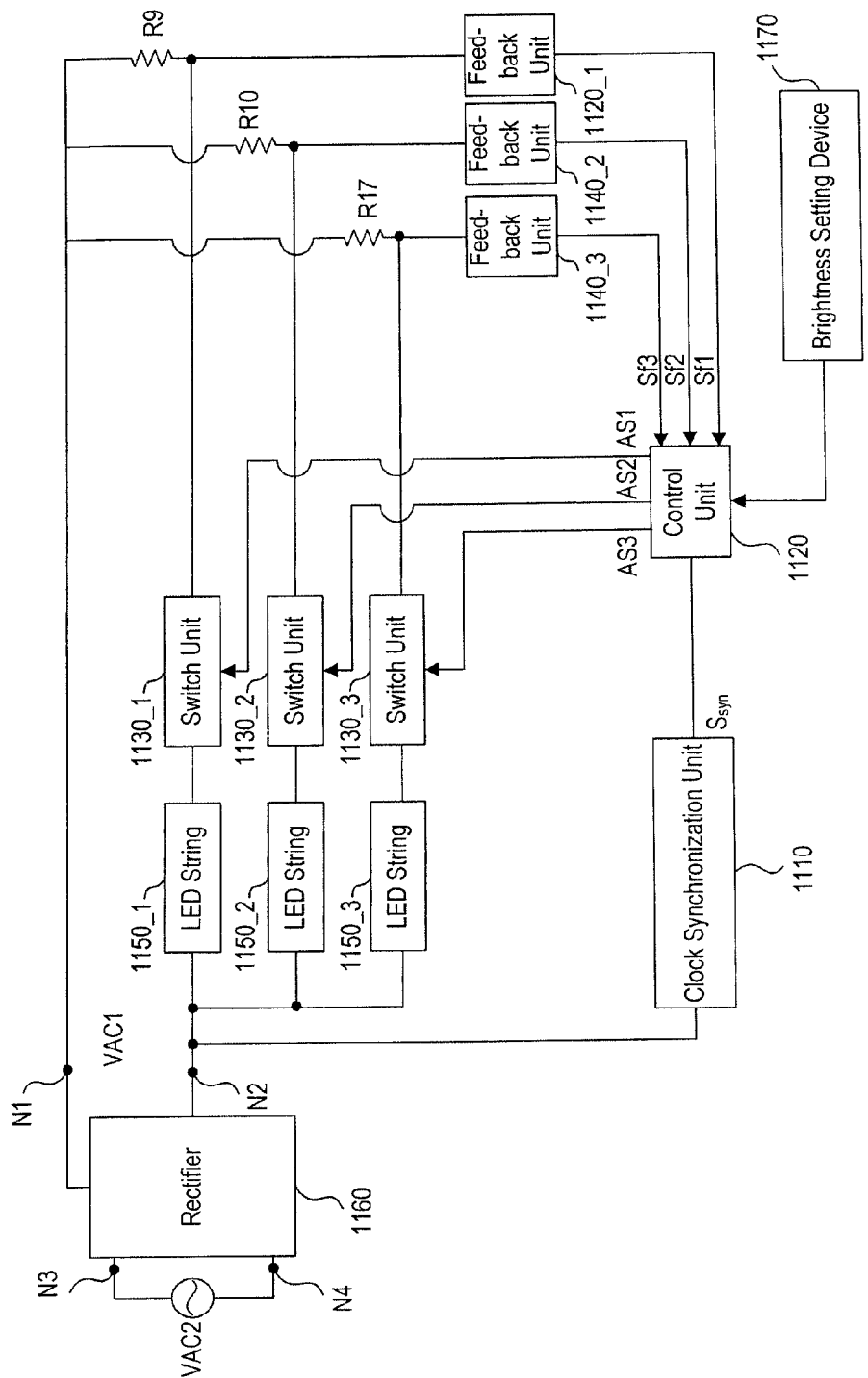
FIG. 11 is a block diagram of another embodiment of a source apparatus including a light source driving unit.

FIG. 11 is a block diagram of a light source apparatus 1100 including a driving apparatus 1105 according to an embodiment of the present invention. Referring to FIG. 11, driving apparatus 1100 includes a clock synchronization unit 1110, a control unit 1120, switch units 1130_1-1130_3, feedback units 1140_1-1140_3, LED strings 1150_1-1150_3, a rectifier 1160, a brightness setting device 1170, ninth resistor R9, tenth resistor R10, and a seventeenth resistor R17. LED strings 1150-1-1150_3 may be red, green, and blue LED strings, respectively.

Resistor R9 is used as a current sensing resistor and is coupled between a first end of switch unit 1130_1 and node N1. Resistors R10 and R17 are similarly used as current sensing resistors and are coupled between first ends of switch units 1130_2 and 1130_3 respectively, and node N1. AC voltage VAC2 is applied to rectifier 1160 through node N3 and node N4. Rectifier 1160 converts AC voltage VAC2 into AC voltage VAC1 between nodes N1 and N2. Node N2 is coupled to provide AC voltage VAC1 as an input to LED strings 1150_1-1150_3 and to clock synchronization unit 1110. Clock synchronization unit 1110 is responsive to AC voltage VAC1 to generate clock synchronization signal Ssyn.

Control unit 1120 is coupled to clock synchronization unit 1110 to receive clock synchronization signal Ssyn. Control unit 1120 is responsive to clock synchronization signal Ssyn and other signals described below to generate adjusting signals AS1-AS3 to each of corresponding switch units 1130_1-1130_3, respectively. Switch units 1130_1-1130_3 selectively apply AC voltage VAC1 to LED strings 1150_1-1150_3, based on the logic voltage levels and pulse widths of adjusting signals AS1-AS3, respectively. When each of switch units 1130_1-1130_3 is closed, AC voltage VAC1 is applied across the corresponding LED strings 1150_1-1150_3, respectively, causing current to flow therethrough and light to be generated. Feedback units 1140_1-1140_3 are respectively coupled to switch units 1130_1-1130_3 and detect a load, i.e., the magnitude of the driving current, on LED strings 1150_1-1150_3 through switch units 1130_1-

1130_3, respectively. Depending on the detected load of LEDs 1150_1-1150_3, feedback units 1140_1-1140_3 generate feedback signals Sf1-Sf3, respectively, which are provided to control unit 1120.

In response to feedback signals Sf1-Sf3, control unit 1120 determines the brightness of light emitted from LEDs 1150_1-1150_3. Control unit 1120 compares each of feedback signals Sf1-Sf3 to a preset brightness value representative of a driving current stored in brightness setting device 1170. The results of the comparisons of the preset brightness values and feedback signals are used as references for modulating the pulse widths of adjusting signals AS1-AS3. Adjusting signals AS1-AS3 are provided to switch units 1130_1-1130_3 to control application of AC voltage VAC1 to LED strings 1150_1-1150_3 to achieve the preset brightness values.

Figure 12:
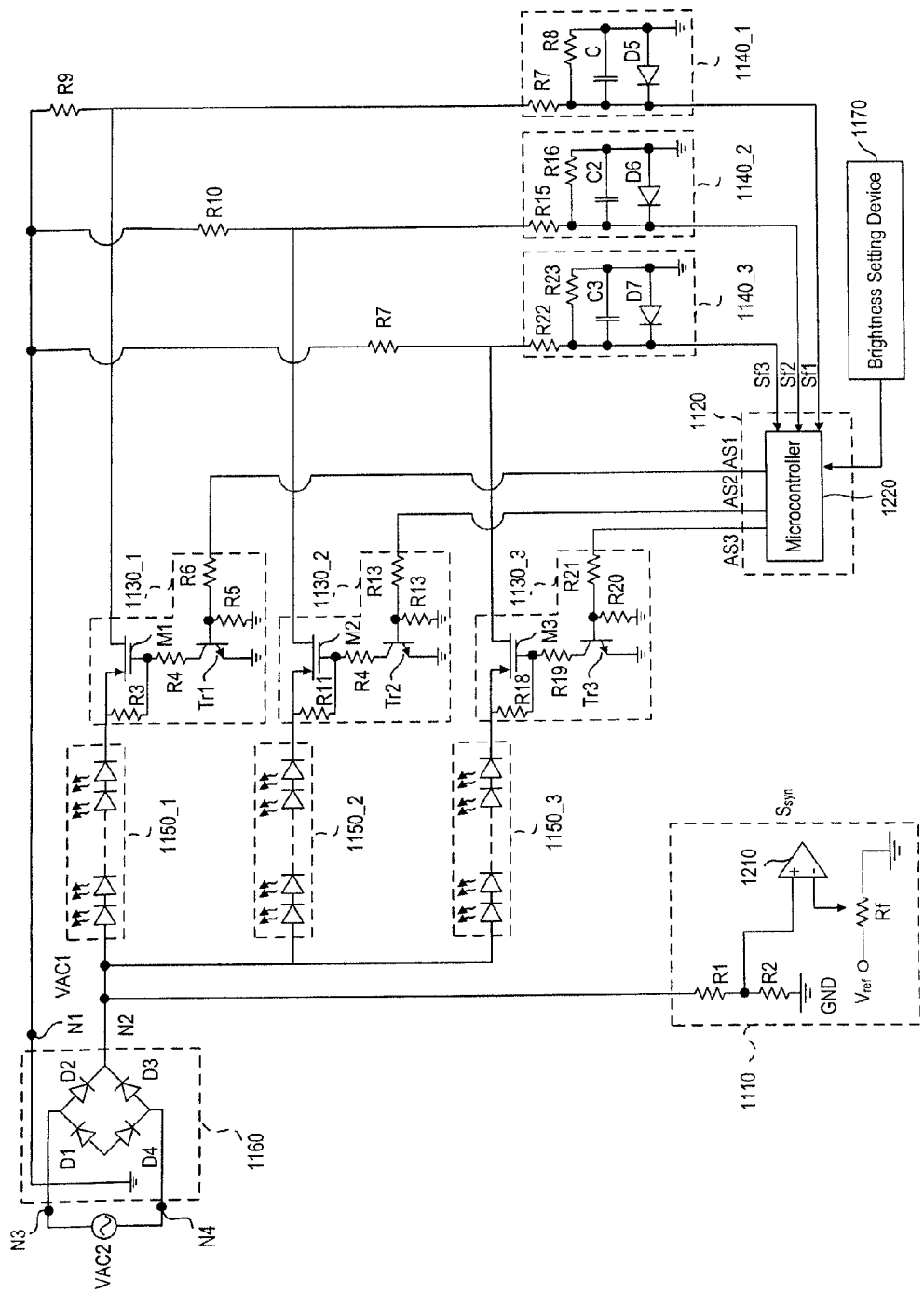
FIG. 12 is a diagram of a circuit embodying the light source apparatus and including the light source driving unit shown in FIG. 11.

FIG. 12 is a diagram of a circuit embodying the light source apparatus 1100 and the driving apparatus 1105 of FIG. 11. Referring to FIG. 12, clock synchronization unit 1110, control unit 1120, switch units 1130_1-1130_3, feedback units 1140_1-1140_3, and rectifier 1160 may be implemented as described in the embodiment shown in FIG. 7 for corresponding features. In the present embodiment, a bridge rectifier is used to realize rectifier 1160. One of ordinary skill in the art will now appreciate that other methods may be used to implement rectifier 1160 as required by a specific application of the present invention. Clock synchronization unit 1110 includes a comparator 1210 that corresponds to comparator 710 shown in FIG. 7. Control unit 1120 includes a microcontroller 1220 that corresponds to microcontroller 720 shown in FIG. 7.

Figure 13:
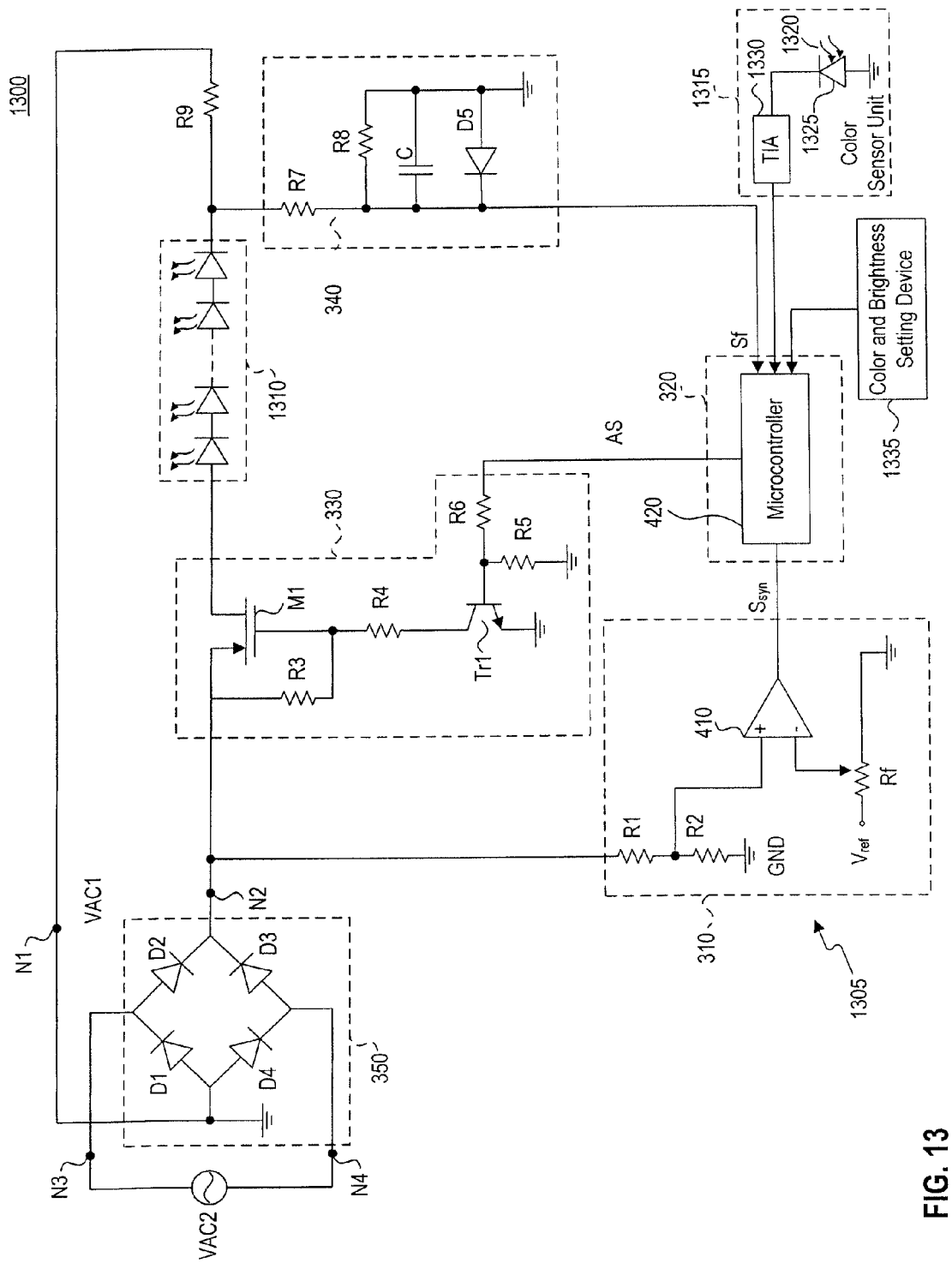
FIG. 13 is a block diagram of another embodiment of a light source apparatus including a light source driving unit.

FIG. 13 is a block diagram of an embodiment of a light source apparatus 1300 including a light source driving apparatus 1305. Light source apparatus 1300 is configured similarly to light source apparatus 300 and the circuit embodiment thereof shown in FIG. 4. Light source apparatus 1300 mainly contains the same features as apparatus 300 and its circuit embodiment, such same features bearing the same reference numerals as set forth in FIGS. 3 and 4 and not being described further except as necessary to explain the configuration and operation of light source apparatus 1300. Light source apparatus 1300 is specifically configured to drive a light source module 1310 that is configured as a string of LEDs all of the same color, such as all red LEDs, all green LEDs, or all blue LEDs. Light source apparatus 1300 further includes a color sensor unit 1315 configured and positioned to detect a single color light 1320 emitted during operation of light source module 1310.

Color sensor unit 1315 includes a photosensor 1325, shown symbolically in FIG. 13 as a photodiode, but which can be provided as any suitable photosensor having a wavelength band sensitivity suitably broad to detect emitted light 1320. Color sensor unit 1315 also includes a transimpedance amplifier (TIA) 1330 configured to detect a current flow generated by photosensor 1325 as representative of emitted light 1320 and provide a corresponding voltage signal representative of an intensity or brightness of emitted light 1320. Persons of ordinary skill will now appreciate the construction of a TIA suitable for the purpose described herein, and no further description of TIA 1330 is provided.

The output of TIA 1330 on which the voltage representative of the brightness of emitted light 1320 is provided is coupled to microcontroller 420. Microcontroller 420 generally includes one or more analog-to-digital converter to convert signals applied thereto to a suitable digital value for further processing. In this regard, microcontroller 420 receives the voltage from TIA 1330 and converts it to a digital value representative of the brightness of emitted light 1320 for further processing, as described more fully below.

Light source apparatus 1300 further includes a color and brightness setting device (CABS) 1335. CABS 1335 stores a preset intensity or brightness value for the particular color light emitted by the single color string of LEDs of light source module 1310. CABS 1335 is coupled to provide a signal representative of the stored preset brightness value to microcontroller 420. Additionally or alternatively, CABS 1335 may be configured to enable a user to adjust and thereby arbitrarily preset the brightness value provided to microcontroller 420.

Figure 14:
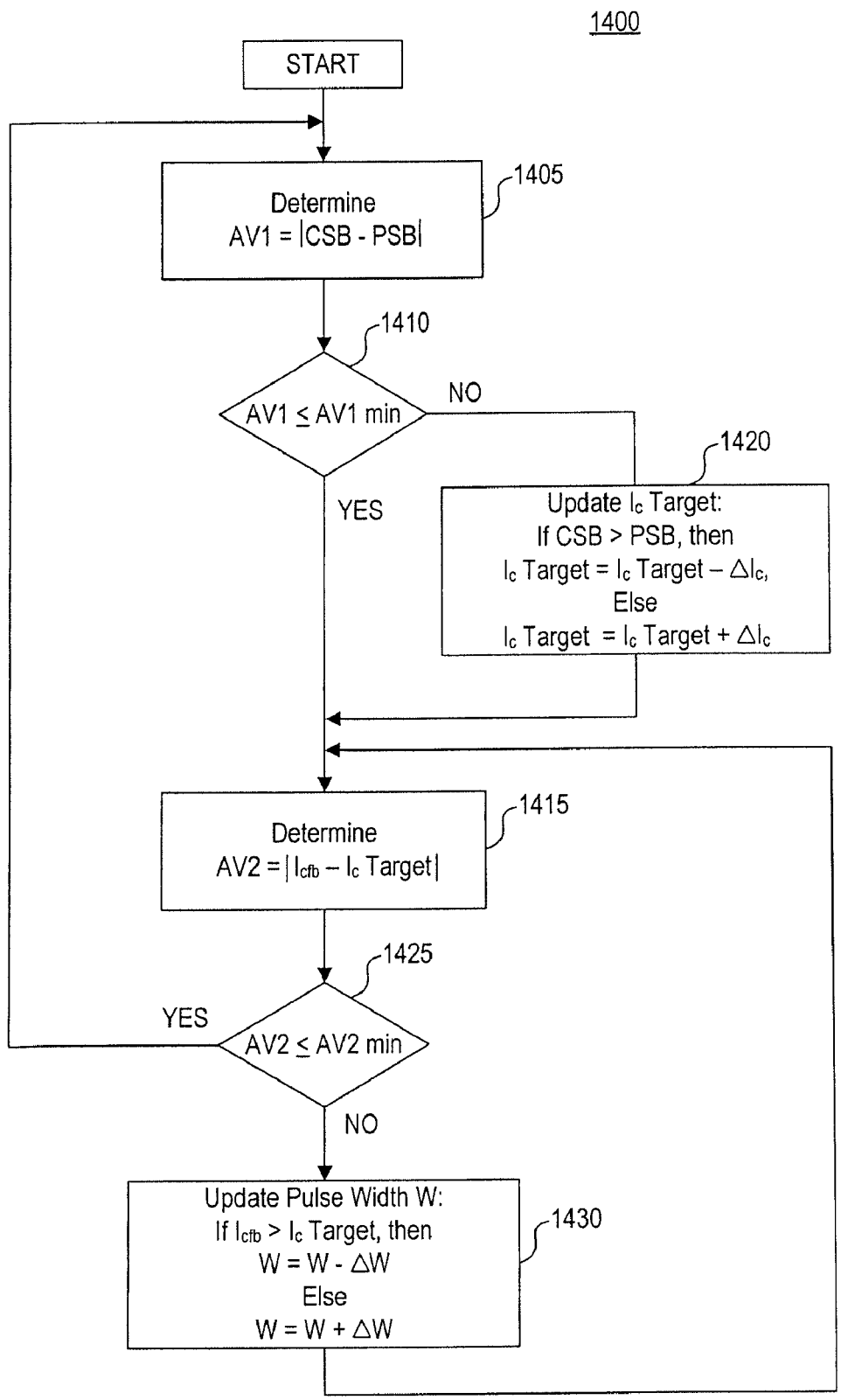
FIG. 14 is a flowchart of processing by a microprocessor included in the light source driving unit shown in FIG. 13.

FIG. 14 illustrates a flowchart 1400 of processing by microcontroller 420 to modulate adjusting signal AS in accordance with the brightness of emitted light 1320 received from color sensor unit 1315, the preset or user adjusted brightness value received form CABS 1335, and feedback signal Sf.

With reference to flowchart 1400, microcontroller 420 determines (step 1405) a value "AV1" as an absolute value of a difference between the brightness value ("CSB") received from color sensor unit 1315 and the preset/user adjusted brightness value ("PSB") received form CABS 1335. Next at step 1410, microcontroller 420 compares AV1 with a predetermined minimum acceptable value AV1min. If AV1 is less than or equal to AV1min, the processing proceeds to step 1415. However, if AV1 is greater than AV1min, processing proceeds to step 1420 in which the present value of a target average driving current IcTarget for driving light source module 1310 is adjusted. Depending on whether the brightness value received from color sensor unit 1315 is greater or less than the brightness value received from CABS 1335, IcTarget is updated by subtracting or adding a current adjustment increment value ΔIc to IcTarget, respectively.

Following step 1420, the process proceeds to step 1415 in which the presently flowing average driving current ("Icfb") represented by feedback signal Sf is compared to IcTarget. In particular, an absolute value "AV2" of the difference between Icfb and IcTarget is determined. Then in step 1425, microcontroller 420 compares AV2 with a predetermined minimum acceptable value AV2min. If AV2 is less than AV2min, it is concluded that the current value of IcTarget is acceptable and processing returns to the beginning of the process at step 1405. However, if AV2 is greater than AV2min, processing proceeds to step 1430 in which pulse width W of adjusting signal AS is adjusted in order to adjust the presently flowing average driving current toward conformance with IcTarget. More particularly, depending on whether Icfb is greater or less than IcTarget, pulse width W is updated by subtracting or adding a pulse width increment value ΔW to W, respectively. Microcontroller 420 will then adjust pulse width W of adjusting signal AS to drive light source module 1310. The processing returns to step 1415 to again perform the determination of AV2 which will now be based on a value of Icfb that reflects the adjusted pulse width W.

Figure 15:
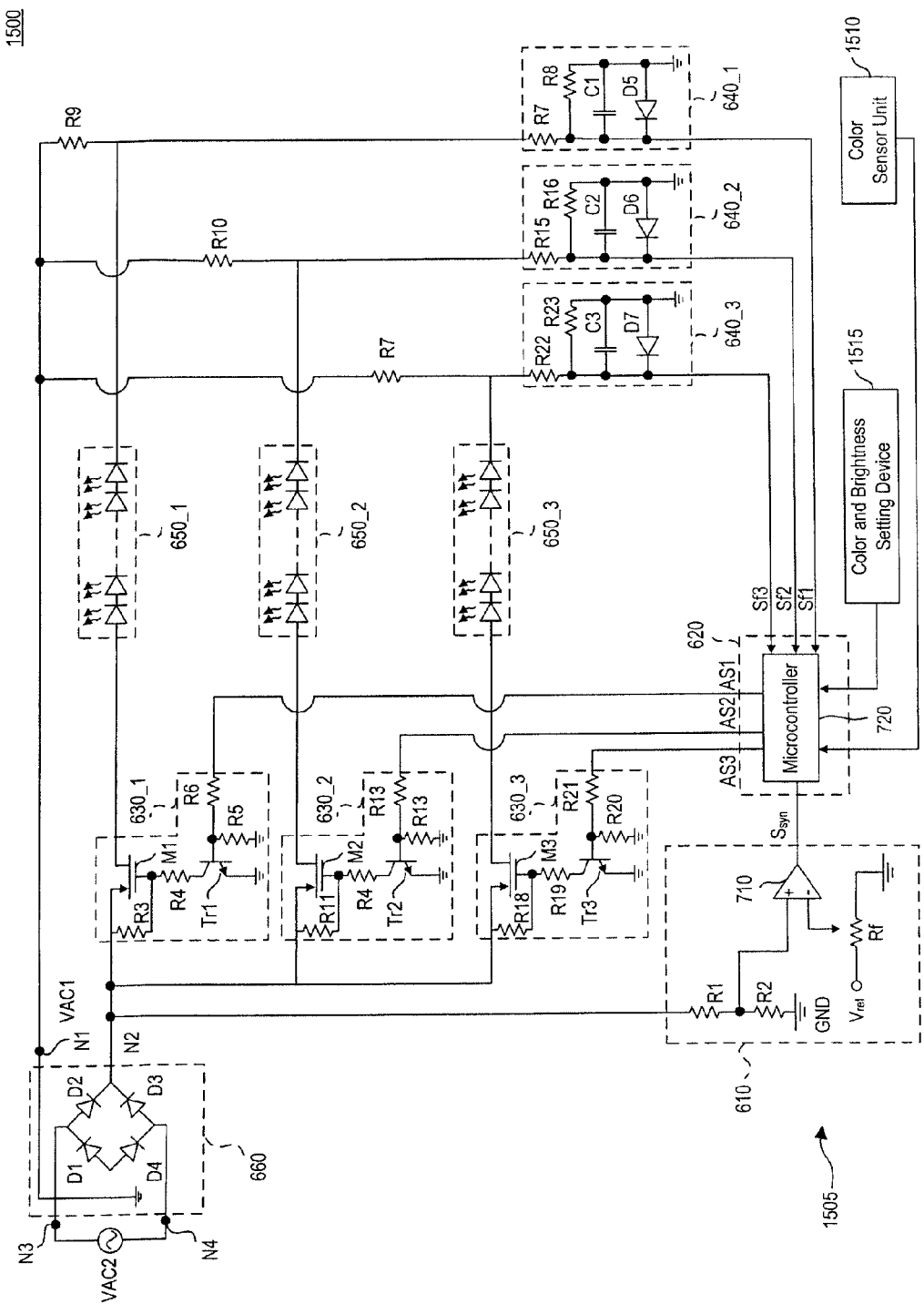
FIG. 15 is a block diagram of another embodiment of a light source apparatus including a light source driving unit.

While FIGS. 13 and 14 illustrate control of light source module 1300 as a single string of LEDs of the same color in accordance with the detected brightness thereof, embodiments consistent with the invention are not so limited. FIG. 15 illustrates a further embodiment of a light source apparatus 1500 including a light source driving apparatus 1505. Light source apparatus 1500 is configured similarly to light source 600 and the circuit embodiment thereof illustrated in FIG. 7. Light source apparatus 1500 generally contains the same features as apparatus 600 and its circuit embodiment, such same features bearing the same reference numerals as set forth in FIGS. 6 and 7 and not being described further except as necessary to explain the configuration and operation of light source 1500.

Light source 1500 is configured to drive LED strings 650_1-650_3, respectively provided as red, green, and blue LED strings. Light source apparatus 1500 further includes a color sensor unit 1510 configured substantially the same as color sensor unit 1315 (FIG. 13), color sensor unit 1510 being provided with a photosensor having a suitable bandwidth to detect the brightness of the red, green, and blue light emitted by LED strings 650_1-650_3, respectively. Color sensor unit 1510 outputs a voltage representative of the currently detected emitted light to microcontroller 720. As in the case of microcontroller 420, microcontroller 720 includes one or more analog-to-digital converters to convert that voltage to a digital value for use in further processing.

Light source apparatus 1500 includes a color and brightness setting device (CABS) 1515. CABS 1515 stores preset brightness values for each of the red, green, and blue LED strings 650_1-650_3, respectively. CABS 1515 is coupled to provide signals representative of the stored preset brightness values to microcontroller 720. Additionally or alternatively, CABS 1515 may be configured to enable a user to adjust and thereby arbitrarily preset any of the brightness values provided to microcontroller 720.

Operation of light source apparatus 1500 proceeds analogous to the manner described above for apparatus 1300. As previously described with reference to FIGS. 7 and 8, microcontroller 720 generates adjusting signals AS1-AS3 to separately drive LED strings 650_1-650_3, respectively. As apparent from the relative timing of adjusting signals AS1-AS3 shown in FIGS. 8(B)-8(D), LED strings 650_1-650_3 are driven at separate non-overlapping times. As a result, color sensor unit 1510 separately receives and detects the intensity of light solely emitted by each of LED strings 650_1-650_3 and provides the representative intensity signal for the currently driven LED string to microcontroller 720. Microcontroller 720 determines the values of each of adjusting signals AS1-AS3 using the same process as described above with reference to flowchart 1400 (FIG. 14). Thus, microcontroller 720 follows the process of flowchart 1400 to determine and adjust adjusting signal AS1 that determines the current driving LED string 650_1 while AS1 is being applied to switch unit 630_1, based on feedback signal Sf1, the intensity of the light emitted by LED string 650_1 as detected by color sensor unit 1510, and the preset/user adjusted brightness value provided by CABS 1515. Then microcontroller 720 similarly follows the process of flowchart 1400 to separately determine and adjust adjusting signals AS2 and AS3 that determine the current driving LED strings 650_2 and 650_3, respectively, while AS2 is being applied to switch unit 630_2, and then during the subsequent non-overlapping period while AS3 is being applied to switch unit 630_3.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A light source driving apparatus to drive at least one light source module, the light source driving apparatus comprising:

a switch unit for coupling in series with an AC power source and the light source module;

a clock synchronization unit for coupling to the AC power source and to provide a clock synchronization signal in accordance with an AC voltage of the AC power source;

a control unit coupled to receive the clock synchronization signal and to provide to the switch unit an adjusting signal according to a timing of the clock synchronization signal; and a feedback unit coupled to the control unit and to detect a load state of the light source module, the feedback unit configured to provide to the control unit a feedback signal having a value representative of the detected load state of the light source module;

wherein the control unit is configured to modulate a pulse width of the adjusting signal according to the feedback signal and a preset brightness value of the light source module, the switch unit responsive to the adjusting signal to open and close to apply the AC voltage to the light source module in accordance with the modulated pulse width.

2. The light source driving apparatus of claim 1 wherein the light source module comprises a light emitting diode string.

3. The light source driving apparatus of claim 1 further including a rectifier coupled to receive and rectify the AC voltage as a first voltage and provide a second AC voltage, the switch unit coupled to the rectifier to receive the second AC voltage.

4. The light source driving apparatus of claim 3 wherein the rectifier is a bridge rectifier.

5. The light source driving apparatus of claim 3 wherein the rectifier includes first and second output terminals on which to provide the second AC voltage, the switch unit including a switching element for coupling in series between one of the first and second output terminals and the light source module.

6. The light source driving apparatus of claim 5 wherein one of the first and second output terminals is grounded.

7. The light source driving apparatus of claim 1 wherein the clock synchronization unit comprises:

a voltage divider for coupling to the AC voltage to provide a divided voltage;

a variable resistor for coupling between first and second voltages to provide a variable output voltage; and a comparator coupled to receive the divided voltage and the variable output voltage and to provide the clock synchronization signal based on a comparison of the divided voltage and the variable output voltage.

8. The light source driving apparatus of claim 7 wherein the voltage divider includes two resistors for coupling in series between the AC voltage and ground.

9. The light source driving apparatus of claim 7 wherein the first voltage is a reference voltage and the second voltage is ground.

10. The light source driving apparatus of claim 1 wherein the control unit comprises:

a microcontroller, coupled to the clock synchronization unit, the switch unit, and the feedback unit, the microcontroller being configured to convert the preset brightness value into a value representative of a driving current for comparison with the feedback signal, the microcontroller providing the adjusting signal according to a result of the comparison.

11. The light source driving apparatus of claim 1 wherein the switch unit comprises:

a first transistor having first and second terminals for coupling in series between the AC power source and the light source module and a third terminal, the first transistor being responsive to a signal applied to the third terminal thereof to control the conductivity between its first and second terminals; and a second transistor having a first terminal coupled to the third terminal of the first transistor, a second terminal for coupling to a predetermined voltage, and a third terminal, the second transistor being responsive to a signal applied to the third terminal thereof to control the conductivity between its first and second terminals, the third terminal of the second transistor coupled to receive the adjusting signal from the control unit.

12. The light source driving apparatus of claim 11 wherein the switch unit further comprises:

a first resistor coupled across the first and third terminals of the first transistor;

a second resistor coupled in series between the third terminal of the first transistor and the first terminal of the second transistor;

a third resistor coupled in series between the third terminal of the second transistor and the control unit; and a fourth resistor coupled between the third terminal of the second transistor and the predetermined voltage.

13. The light source driving apparatus of claim 12 wherein the predetermined voltage is ground.

14. The light source driving apparatus of claim 11 wherein the first transistor is an MOS transistor.

15. The light source driving apparatus of claim 11 wherein the second transistor is a bipolar junction transistor.

16. The light source driving apparatus of claim 1 wherein the feedback unit comprises an integrating circuit.

17. The light source driving apparatus of claim 16 further including a current sensing resistor for coupling in series with the light source module;

wherein the integrating circuit comprises:

a first resistor coupled at one end between the current sensing resistor and at the other end to the control unit; and a second resistor, a capacitor, and a diode coupled in parallel together between the second end of the first resistor and a predetermined voltage.

18. The light source driving apparatus of claim 17 wherein the predetermined voltage is ground.

19. A light source driving apparatus to drive a plurality of light source modules, the light source driving apparatus comprising:

a first switch unit for coupling in series with an AC power source and a first one of the light source modules;

a second switch unit coupled in parallel with the first switch unit and in series with the AC power source and a second one of the light source modules;

a clock synchronization unit for coupling to the AC power source and to provide a clock synchronization signal in accordance with an AC voltage of the AC power source;

a control unit coupled to receive the clock synchronization signal and to provide to the first and second switch units first and second adjusting signals, respectively, according to a timing of the clock synchronization signal; and first and second feedback units coupled to the control unit and to detect a load state of the first and second light source modules, respectively, the first and second feedback units configured to provide to the control unit first and second feedback signals, respectively, having values representative of the respective detected load states of the first and second light source modules;

wherein the control unit is configured to modulate a pulse width of each of the first and second adjusting signals according to the first and second feedback signals, respectively, and a preset brightness value of each of the first and second light source modules, the first and second switch units respectively responsive to the first and second adjusting signals to open and close to respectively apply the AC voltage to the first and second light source modules in accordance with the modulated pulse widths of the first and second adjusting signals.

20. A light source driving apparatus to drive first, second, and third light source modules, the light source driving apparatus comprising:

a first switch unit for coupling in series with an AC power source and the first light source module;

a second switch unit coupled in parallel with the first switch unit and in series with the AC power source and the second light source module;

a third switch unit coupled in parallel with the first switch unit and the second switch unit and in series with the AC power source and the third light source module;

a clock synchronization unit for coupling to the AC power source and to provide a clock synchronization signal in accordance with an AC voltage of the AC power source;

a control unit coupled to receive the clock synchronization signal and to provide to the first, second, and third switch units first, second, and third adjusting signals, respectively, according to a timing of the clock synchronization signal; and first, second, and third feedback units coupled to the control unit and to detect a load state of the first, second, and third light source modules, respectively, the first, second, and third feedback units configured to provide to the control unit first, second, and third feedback signals, respectively, having values representative of the respective detected load states of the first, second, and third light source module;

wherein the control unit is configured to modulate a pulse width of each of the first, second, and third adjusting signals according to the first, second, and third feedback signals, respectively, and a preset brightness value of each of the first, second, and third light source modules, the first, second, and third switch units respectively responsive to the first, second, and third adjusting signals to open and close to respectively apply the AC voltage to the first, second, and third light source modules in accordance with the modulated pulse widths of the first, second, and third adjusting signals.

21. A light source driving apparatus, comprising:

a light source module;

a switch unit coupled in series with an AC power source and the light source module;

a clock synchronization unit for coupling to the AC power source and to provide a clock synchronization signal in accordance with an AC voltage of the AC power source;

a control unit coupled to receive the clock synchronization signal and to provide to the switch unit an adjusting signal according to a timing of the clock synchronization signal; and a feedback unit coupled to the control unit and to detect a load state of the light source module, the feedback unit configured to provide to the control unit a feedback signal having a value representative of the detected load state of the light source module;

wherein the control unit is configured to modulate a pulse width of the adjusting signal according to the feedback signal and a preset brightness value of the light source module, the switch unit responsive to the adjusting signal to open and close to apply the AC voltage to the light source module in accordance with the modulated pulse width.

22. The light source driving apparatus of claim 21 wherein the light source module comprises a light emitting diode string.

23. The light source driving apparatus of claim 21 further including a rectifier coupled to receive and rectify the AC voltage as a first voltage and provide a second AC voltage, the switch unit coupled to the rectifier to receive the second AC voltage.

24. The light source driving apparatus of claim 23 wherein the rectifier is a bridge rectifier.

25. The light source driving apparatus of claim 23 wherein the rectifier includes first and second output terminals on which to provide the second AC voltage, the switch unit including a switching element for coupling in series between one of the first and second output terminals and the light source module.

26. The light source driving apparatus of claim 25 wherein one of the first and second output terminals is grounded.

27. The light source driving apparatus of claim 21 wherein the clock synchronization unit comprises:
- a voltage divider for coupling to the AC voltage to provide a divided voltage;
- a variable resistor for coupling between first and second voltages to provide a variable output voltage; and
- a comparator coupled to receive the divided voltage and the variable output voltage and to provide the clock synchronization signal based on a comparison of the divided voltage and the variable output voltage.

28. The light source driving apparatus of claim 27 wherein the voltage divider includes two resistors for coupling in series between the AC voltage and ground.

29. The light source driving apparatus of claim 27 wherein the first voltage is a reference voltage and the second voltage is ground.

30. The light source driving apparatus of claim 21 wherein the control unit comprises:
- a microcontroller, coupled to the clock synchronization unit, the switch unit, and the feedback unit, the microcontroller being configured to convert the preset brightness value into a value representative of a driving current for comparison with the feedback signal, the microcontroller providing the adjusting signal according to a result of the comparison.

31. The light source driving apparatus of claim 21 wherein the switch unit comprises:
- a first transistor having first and second terminals for coupling in series between the AC power source and the light source module and a third terminal, the first transistor being responsive to a signal applied to the third terminal thereof to control the conductivity between its first and second terminals; and
- a second transistor having a first terminal coupled to the third terminal of the first transistor, a second terminal for coupling to a predetermined voltage, and a third terminal, the second transistor being responsive to a signal applied to the third terminal thereof to control the conductivity between its first and second terminals, the third terminal of the second transistor coupled to receive the adjusting signal from the control unit.

32. The light source driving apparatus of claim 31 wherein the switch unit further comprises:
- a first resistor coupled across the first and third terminals of the first transistor;
- a second resistor coupled in series between the third terminal of the first transistor and the first terminal of the second transistor;
- a third resistor coupled in series between the third terminal of the second transistor and the control unit; and
- a fourth resistor coupled between the third terminal of the second transistor and the predetermined voltage.

33. The light source driving apparatus of claim 22 wherein the predetermined voltage is ground.

34. The light source driving apparatus of claim 31 wherein the first transistor is an MOS transistor.

35. The light source driving apparatus of claim 31 wherein the second transistor is a bipolar junction transistor.

36. The light source driving apparatus of claim 21 wherein the feedback unit comprises an integrating circuit.

37. The light source driving apparatus of claim 36 further including a current sensing resistor coupled in series with the light source module;
wherein the integrating circuit comprises:
- a first resistor coupled at one end between the current sensing resistor and at the other end to the control unit; and
- a second resistor, a capacitor, and a diode coupled in parallel together between the second end of the first resistor and a predetermined voltage.

38. The light source driving apparatus of claim 37 wherein the predetermined voltage is ground.

39. A light source driving apparatus to drive at least one light source module, the light source apparatus comprising:
- a switch unit for coupling in series with an AC power source and the light source module;
- a clock synchronization unit for coupling to the AC power source and to provide a clock synchronization signal in accordance with an AC voltage of the AC power source;
- a control unit coupled to receive the clock synchronization signal and to provide to the switch unit an adjusting signal according to a timing of the clock synchronization signal;
- a feedback unit coupled to the control unit and to detect a load state of the light source module, the feedback unit configured to provide to the control unit a feedback signal having a value representative of the detected load state of the light source module; and
- a sensor unit to detect a brightness of light emitted from the light source module when driven and to provide to the control unit a signal representative of the detected brightness;
wherein the control unit is configured to modulate a pulse width of the adjusting signal according to the feedback signal, a preset brightness value of the light source module, and the detected brightness, the switch unit responsive to the adjusting signal to open and close to apply the AC voltage to the light source module in accordance with the modulated pulse width.

40. The light source driving apparatus of claim 39 wherein the control unit is further configured to modulate the pulse width of the adjusting signal to cause the detected brightness to approach the preset brightness.

41. The light source driving apparatus of claim 39 wherein the light source module emits light of only one color.

42. A light source driving apparatus to drive a plurality of light source modules, the light source apparatus comprising:
- a first switch unit for coupling in series with an AC power source and a first one of the light source modules;
- a second switch unit coupled in parallel with the first switch unit and in series with the AC power source and a second one of the light source modules;

a clock synchronization unit for coupling to the AC power source and to provide a clock synchronization signal in accordance with an AC voltage of the AC power source;

a control unit coupled to receive the clock synchronization signal and to provide to the first and second switch units non-overlapping first and second adjusting signals, respectively, according to a timing of the clock synchronization signal; and first and second feedback units coupled to the control unit and to detect a load state of the first and second light source modules, respectively, the first and second feedback units configured to provide to the control unit first and second feedback signals, respectively, having values representative of the respective detected load states of the first and second light source modules, each of the first and second light source modules being configured to only emit light of first and second colors, respectively;

a color sensor unit to detect a brightness of the first color light and the second color light when emitted by the first and second light sources, respectively, and to provide to the control unit signals respectively representative of the detected brightness of the emitted first and second color lights;

wherein the control unit is configured to modulate a pulse width of each of the first and second adjusting signals according to the first and second feedback signals, respectively, a preset brightness value of each of the first and second light source modules, and the detected brightness of the emitted first and second color light, the first and second switch units respectively responsive to the first and second adjusting signals to open and close to respectively apply the AC voltage to the first and second light source modules in accordance with the modulated pulse widths of the non-overlapping first and second adjusting signals, so that the first and second light source modules are driven to light at non-overlapping times.

43. The light source driving apparatus of claim 42 wherein the control unit is further configured to modulate the pulse width of the adjusting signal to cause the detected brightnesses of the emitted first and second color light to approach the preset brightnesses for the first and second color light.

* * * * *